(12) United States Patent
Kwak et al.

(10) Patent No.: US 11,348,490 B1
(45) Date of Patent: May 31, 2022

(54) METHOD OF CONTROLLING DISPLAY AND ELECTRONIC DEVICE SUPPORTING THE SAME

(71) Applicant: Samsung Electronics Co., Ltd., Gyeonggi-do (KR)

(72) Inventors: Myunghoon Kwak, Gyeonggi-do (KR); Sangeun Lee, Gyeonggi-do (KR); Soyoung Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/326,923

(22) Filed: May 21, 2021

(30) Foreign Application Priority Data

Nov. 6, 2020 (KR) .......................... 10-2020-0148049
Nov. 26, 2020 (KR) .......................... 10-2020-0161477

(51) Int. Cl.
*G09F 9/30* (2006.01)
*G06F 1/16* (2006.01)
(Continued)

(52) U.S. Cl.
CPC ............ *G09F 9/301* (2013.01); *G06F 1/1643* (2013.01); *G06F 1/1652* (2013.01);
(Continued)

(58) Field of Classification Search
CPC .... G06F 3/0412; G06F 3/0414; G06F 3/0487; G06F 3/0488; G06F 1/1643; G06F 1/1652; G06F 2203/04102; G09F 9/301
See application file for complete search history.

(56) References Cited

U.S. PATENT DOCUMENTS 10,203,863 B2  2/2019  Kwon et al.
10,452,156 B2  10/2019 Kang et al.
(Continued)

FOREIGN PATENT DOCUMENTS

JP      2009-110286    5/2009
KR     10-1370719     3/2014
(Continued)

OTHER PUBLICATIONS

Korean Notice of Preliminary Examination Results dated Feb. 8, 2021 issued in counterpart application KR 10-2020-0161477, 4 pages.

(Continued)

*Primary Examiner* — Ryan A Lubit
(74) *Attorney, Agent, or Firm* — The Farrell Law Firm, P.C.

(57) ABSTRACT

An electronic device and method are provided. The electronic device includes a flexible display including a first state in which a display area has a first size and a second state in which the display area is expanded in a first direction to have a second size larger than the first size, an actuator driven to change a state of the flexible display, and a processor configured to detect a touch input on a point of the display area, which is located adjacent to a side surface of the electronic device, and identify whether a touch point of the touch input is moved from the point of the display area by a specified distance or more in a same direction as a direction in which the state of the flexible display is changed in a state in which the touch input is maintained.

14 Claims, 19 Drawing Sheets

(51) Int. Cl.
  *G06F 3/041* (2006.01)
  *G06F 3/0487* (2013.01)
  *G06F 3/0488* (2022.01)

(52) U.S. Cl.
  CPC .......... *G06F 3/0412* (2013.01); *G06F 3/0414* (2013.01); *G06F 3/0487* (2013.01); *G06F 3/0488* (2013.01); *G06F 2203/04102* (2013.01)

(56) References Cited

U.S. PATENT DOCUMENTS

| | | | |
|---|---|---|---|
| 2009/0109187 A1 | 4/2009 | Noma | |
| 2014/0372896 A1* | 12/2014 | Raman | G06F 3/017 |
| | | | 715/741 |
| 2015/0346916 A1* | 12/2015 | Jisrawi | H04L 51/14 |
| | | | 715/752 |
| 2019/0261519 A1* | 8/2019 | Park | H04M 1/0268 |
| 2020/0170128 A1* | 5/2020 | Kim | G02F 1/13338 |
| 2020/0336577 A1* | 10/2020 | Han | H04M 1/0241 |
| 2021/0213830 A1* | 7/2021 | Son | G06F 1/1652 |
| 2021/0213831 A1* | 7/2021 | Kang | B60K 37/06 |

FOREIGN PATENT DOCUMENTS

| | | |
|---|---|---|
| KR | 10-2016-0043837 | 4/2016 |
| KR | 10-1654335 | 9/2016 |
| KR | 10-2016-0139643 | 12/2016 |
| KR | 10-2017-0024942 | 3/2017 |
| KR | 10-2017-0038308 | 4/2017 |
| KR | 10-2019-0101184 | 8/2019 |
| KR | 10-2247663 | 5/2021 |

OTHER PUBLICATIONS

Korean Notice of Patent Grant dated Mar. 15, 2021 issued in counterpart application KR 10-2020-00161477, 6 pages.
International Search Report dated Aug. 24, 2021 issued in counterpart application No. PCT/KR2021/006237, 7 pages.

* cited by examiner

METHOD OF CONTROLLING DISPLAY AND ELECTRONIC DEVICE SUPPORTING THE SAME

CROSS-REFERENCE TO RELATED APPLICATION(S)

This application is based on and claims priority under 35 U.S.C. § 119 to Korean Patent Application Nos. 10-2020-0148049 and 10-2020-0161477, filed on Nov. 6, 2020 and Nov. 26, 2020, respectively, in the Korean Intellectual Property Office, the disclosure of each of which is incorporated herein by reference in its entirety.

BACKGROUND

1. Field

The present disclosure relates generally to a display control technique.

2. Description of Related Art

In recent years, electronic devices, such as smartphones, are becoming lighter, thinner, and smaller for convenience of carrying, and are being developed in various ways for convenience of use. In order to meet users' demands for miniaturization of electronic devices and enlargement of screens, a scheme of utilizing the flexibility of a flexible display has been considered. As an example of such a scheme, a rollable type (or a sliding type) electronic device including a flexible display has been developed.

In such a rollable type electronic device, when a portion of the flexible display is retracted into (e.g., rolled or slid into) the housing of the electronic device, the size of the screen decreases and the size of the electronic device also decreases, which makes it convenient to carry the electronic device, and when a portion of the retracted flexible display is drawn out (e.g., rolled out or slid out), the size of the screen increases, which makes it possible to provide a relatively large screen compared to existing bar-type electronic devices and thus to improve convenience of use.

Meanwhile, in a rollable type electronic device, a motorized scheme may be applied in order to facilitate changing the state of the flexible display. For example, an electronic device may include an actuator that causes a flexible display to be retracted into and drawn out (e.g., rolled or slid into or out) using a motor or electric force. In this case, the electronic device may drive the actuator in response to a user's touch input.

However, in conventional electronic devices, a malfunction may occur in the process of identifying whether the touch input is a touch input for changing the state of the flexible display or a touch input for performing a general function. In addition, in order to suppress such a malfunction, in conventional electronic devices, it is possible to set a touch input for changing the state of the flexible display as a multi-touch input (e.g., a touch input using at least two fingers). In the state of gripping the electronic device with one hand, a user may feel uncomfortable with inputting the multi-touch, and thus usability may be degraded.

SUMMARY

The present disclosure has been made to address at least the disadvantages described above and to provide at least the advantages described below.

In accordance with an aspect of the present disclosure, an electronic device is provided. The electronic device includes a flexible display including a first state in which a display area has a first size and a second state in which the display area is expanded in a first direction to have a second size larger than the first size, an actuator driven to change a state of the flexible display, and a processor operatively connected to the flexible display and the actuator. The processor is configured to detect a touch input on a point of the display area, which is located adjacent to a side surface of the electronic device, identify whether a touch point of the touch input is moved from the point of the display area by a specified distance or more in a same direction as a direction in which the state of the flexible display is changed in a state in which the touch input is maintained, and drive the actuator so as to change the state of the flexible display based on identifying that the touch point is moved from the point of the display area by the specified distance or more in the same direction as the direction in which the state of the flexible display is changed.

In accordance with an aspect of the present disclosure, a method of controlling a display of an electronic device is provided. The method includes detecting a touch input at a point of the display area, which is located adjacent to a side surface of the electronic device, on a flexible display including a first state in which a display area has a first size and a second state in which the display area is expanded in a first direction to have a second size larger than the first size, identifying whether a touch point of the touch input is moved from the point of the display area by a specified distance or more in a same direction as a direction in which the state of the flexible display is changed in a state in which the touch input is maintained, and driving the actuator so as to change the state of the flexible display based on identifying that the touch point is moved from the point of the display area by the specified distance or more in the same direction as the direction in which the state of the flexible display is changed.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
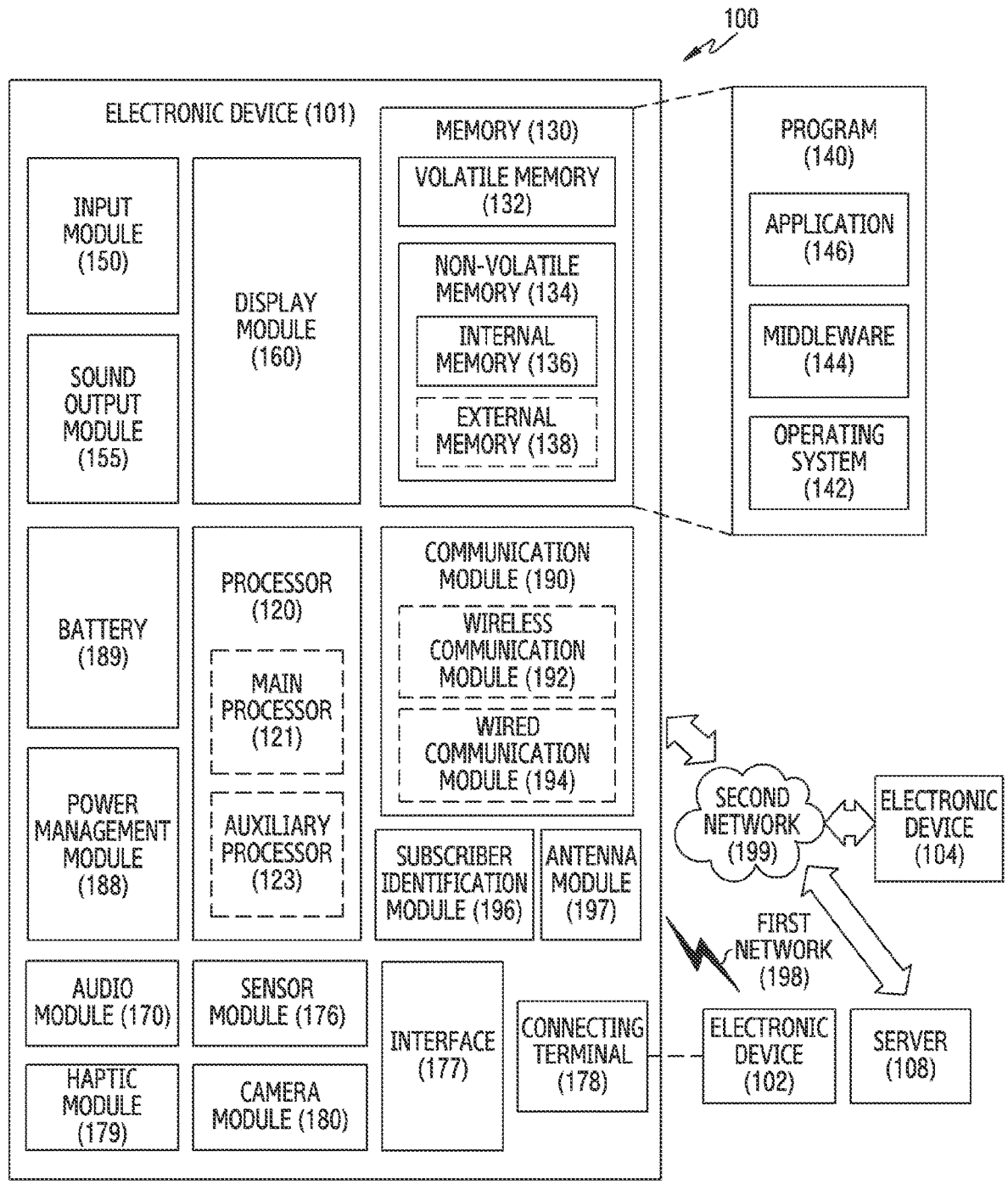
FIG. 1 is a block diagram of an electronic device according to various embodiments in a network environment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
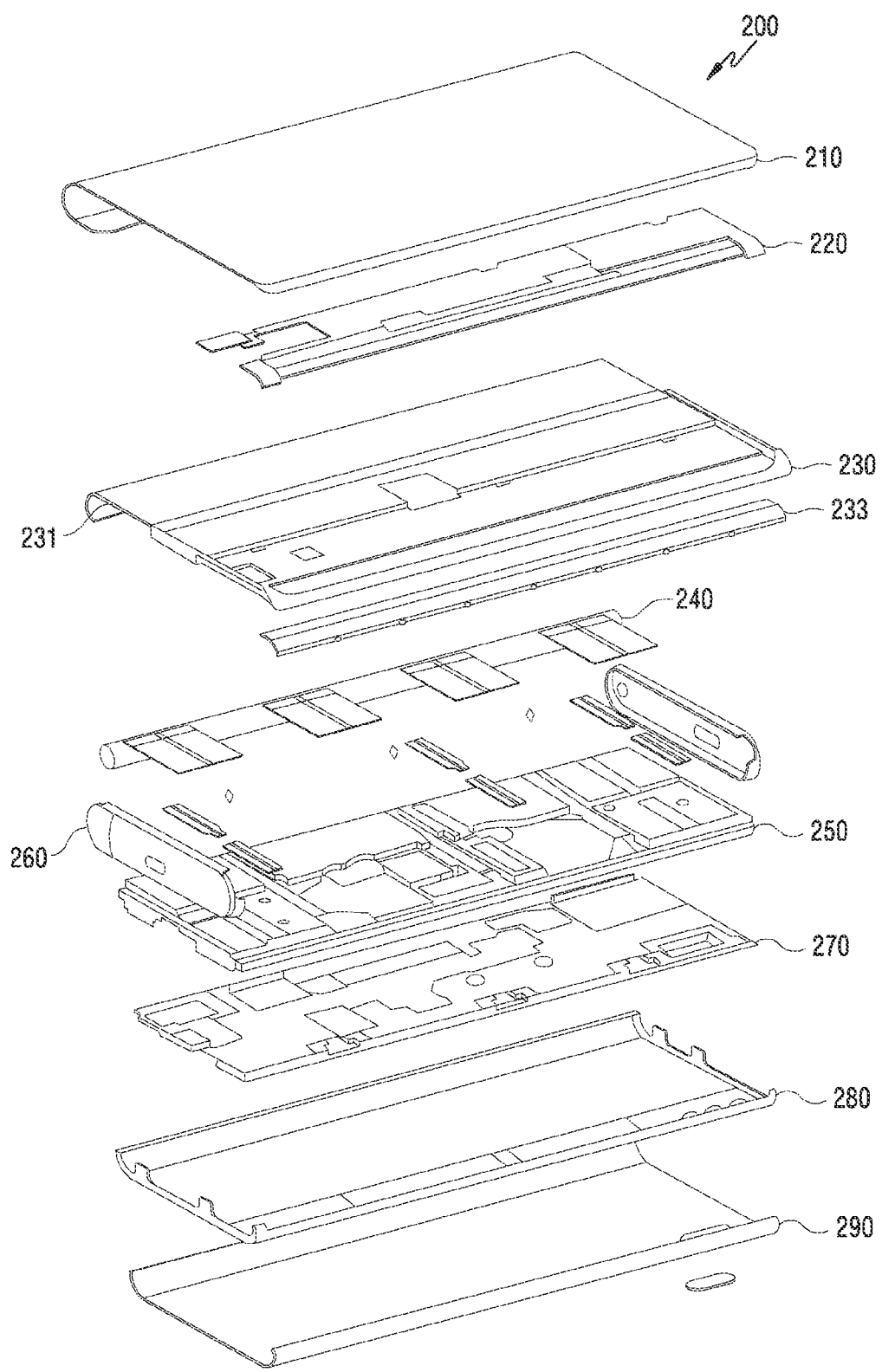
FIG. 2 is a diagram with an exploded perspective view illustrating an electronic device, according to an embodiment.

FIG. 2 is a diagram of an exploded perspective view illustrating an electronic device, according to an embodiment.

Referring to FIG. 2, an electronic device 200 may include a flexible display 210, a first support member 220 (e.g., a bracket), a slide plate 230, a roller 240, a second support member 250 (e.g., a front case), a side cover 260, a third support member 270 (e.g., a middle case), a fourth support member 280 (e.g., a rear case), and a rear plate 290 (e.g., a rear cover).

The housing of the electronic device 200 may include a front plate disposed to cover the front surface of the flexible display 210, the rear plate 290 forming the rear surface of the electronic device 200, the slide plate 230 coupled to be movable through a sliding operation between the front plate and the rear plate 290, and the side cover 260 disposed to cover a side surface in a direction substantially perpendicular to the moving direction of the slide plate 230. The rear plate 290 may further include a portion extending toward the front surface of the electronic device 200, and this extending portion may form a portion of the side surface of the electronic device 200. In the space between the front surface (e.g., the front plate), the rear surface (e.g., the rear plate 290), and the side surface (e.g., the side cover 260 and the extending portion of the rear plate 290) of the housing, electronic components can be placed. A PCB on which a battery or various electronic elements (e.g., a processor, a memory, and/or an interface) are disposed may be disposed in the space. At least one of the above-described components (e.g., the first support member 220, the second support member 250, the third support member 270, or the fourth support member 280) may be omitted from the electronic device 200, or the electronic device 200 may further include at least one other component.

The flexible display 210 may be movably coupled to the housing of the electronic device 200. The flexible display 210 may be coupled to the slide plate 230 and the first support member 220, and at least a portion of a display area may be selectively visually exposed to the outside by the sliding operation of the slide plate 230. The display area of the flexible display 210 may include a first portion that is always visually exposed to the outside to be capable of displaying an object, and a second portion that extends from the first portion and is configured such that the second portion is not exposed to the outside by being retracted into the inside of the housing and is capable of being visually exposed to the outside by being drawn out from the housing. The display area of the flexible display 210 may have a first size (in width and/or height) in a first state in which the second portion is not exposed and a second size (in width and/or height) larger than the first size in a second state in which the second portion is exposed to the outside. Here, the first state may be the state in which the display area of the flexible display 210 is contracted, and the second state may be the state in which the display area of the flexible display 210 is expanded.

The flexible display 210 may be coupled to a flat surface corresponding to the front surface of the first support member 220 and/or the front surface of the slide plate 230 and a curved surface corresponding to the side surface of the slide plate 230. The curved surface may be provided by a hinge member 231 (e.g., a caterpillar joint) connected to the slide plate 230. The hinge member 231 may include a multi-joint hinge. The multi-joint hinge may be attached to the rear surface of the flexible display 210 so as to guide bending of the flexible display 210.

The first support member 220 and the slide plate 230 are capable of supporting the flexible display 210. The slide plate 230 may perform a sliding operation on the second support member 250 in a lateral direction. Accordingly, the flexible display 210 coupled to the slide plate 230 also performs a sliding operation in the lateral direction such that it is possible to expand or contract the display area of the flexible display 210. The slide plate 230 may be open in an area adjacent to the side surface thereof in a direction in which the slide plate 230 is drawn out from the inside of the housing to the outside. In addition, the slide plate 230 may be coupled to a decoration member 233 disposed to cover the opened area.

The roller 240 may be connected to the hinge member 231 of the slide plate 230 so as to allow the slide plate 230 to perform a sliding operation. The roller 240 may be provided in the shape of a bar, and may rotate. The roller 240 may rotate according to the driving of an actuator such as a motor. The hinge member 231, which is in contact with the outer peripheral surface of the roller 240, may be bent and moved with respect to the roller 240 by the rotation of the roller 240. When the roller 240 rotates in a first direction, the hinge member 231 may be rolled into the inside of the housing along the outer peripheral surface of the roller 240. As a result, it is possible to contract the display area of the flexible display 210, which is visually exposed to the outside. Alternatively, when the roller 240 rotates in a second direction that is opposite to the first direction, the hinge member 231 may be spread outward from the housing along the outer peripheral surface of the roller 240. As a result, the display area of the flexible display 210, which is visually exposed to the outside, is capable of being expanded.

The second support member 250 may be coupled to the rear surface of the slide plate 230 so as to support the slide plate 230. The third support member 270 may be disposed on the rear surface of the second support member 250, and the fourth support member 280 may be disposed on the rear surface of the third support member 270. The PCB, to which various electronic components of the electronic device 200 are electrically connected or on which some electronic components are disposed, may be disposed between the second support member 250 and the third support member 270. A battery may be disposed between the third support member 270 and the fourth support member 280.

The side cover 260 may be disposed so as to cover a side surface in a direction substantially perpendicular to the moving direction of the slide plate 230. The side cover 260 may cover the side surfaces of the second support member 250, the third support member 270, and the fourth support member 280. The side cover 260 may cover at least a portion of side surfaces of the flexible display 210 and the slide plate 230. In the first state in which the display area of the flexible display 210 is contracted, the side cover 260 may cover the side surfaces of the flexible display 210 and the slide plate 230, and in the second state in which the display area of the flexible display 210 is expanded, the side cover 260 may cover only a side surface of the flexible display 210 except for some side surfaces and the slide plate 230 corresponding to the expending portion of the display area. At least a portion of the side surface of the side cover 260 in the direction in which the slide plate 230 is drawn out to the outside from the inside of the housing may be opened. Accordingly, the slide plate 230 may be drawn out to the outside of the housing through the opened portion of the side cover 260.

The rear plate 290 may form the rear surface of the electronic device 200. The rear plate 290 may be coupled to the rear surface of the fourth support member 280.

Figure 3:
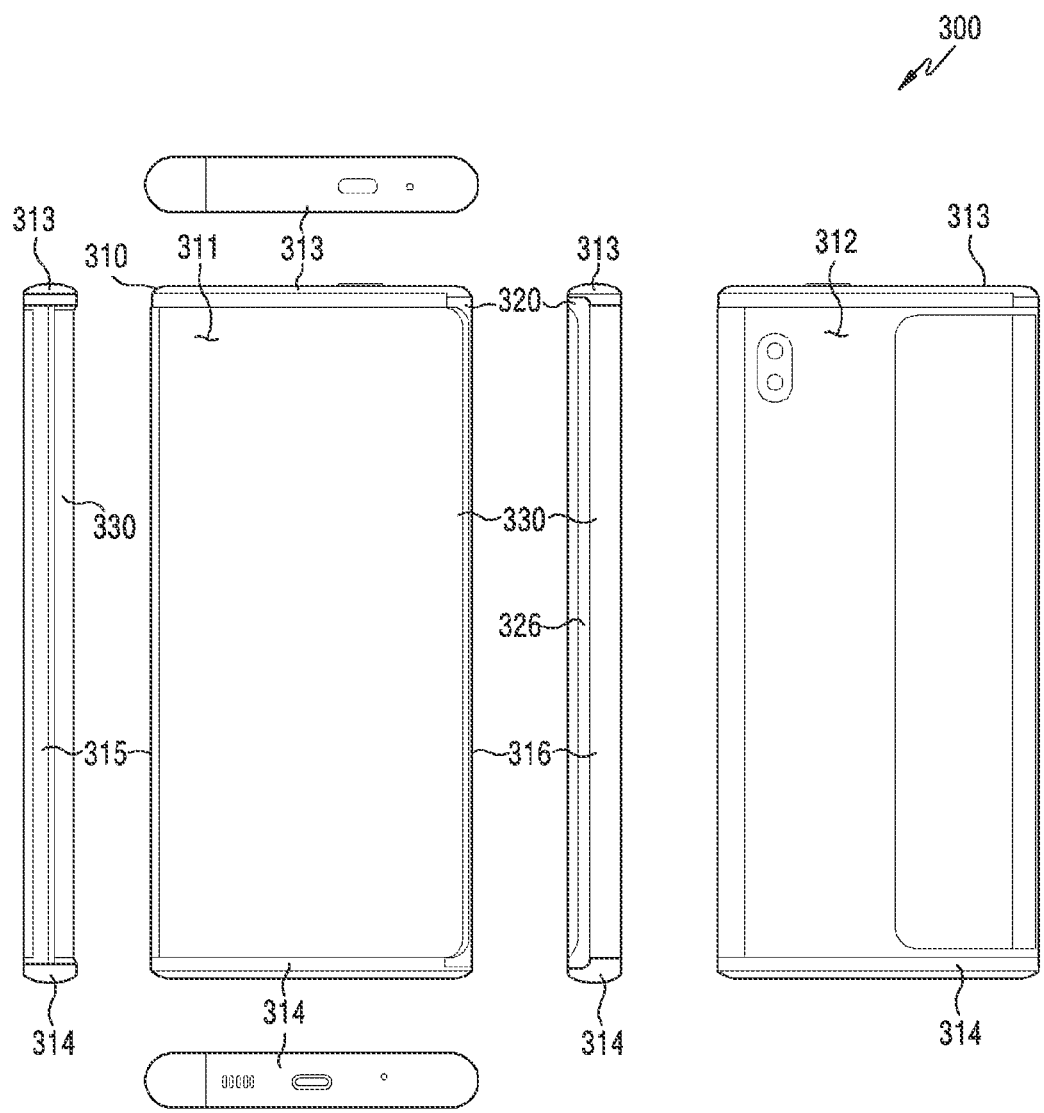
FIG. 3 is a diagram illustrating an electronic device when a flexible display is in a first state, according to an embodiment.
Figure 4:
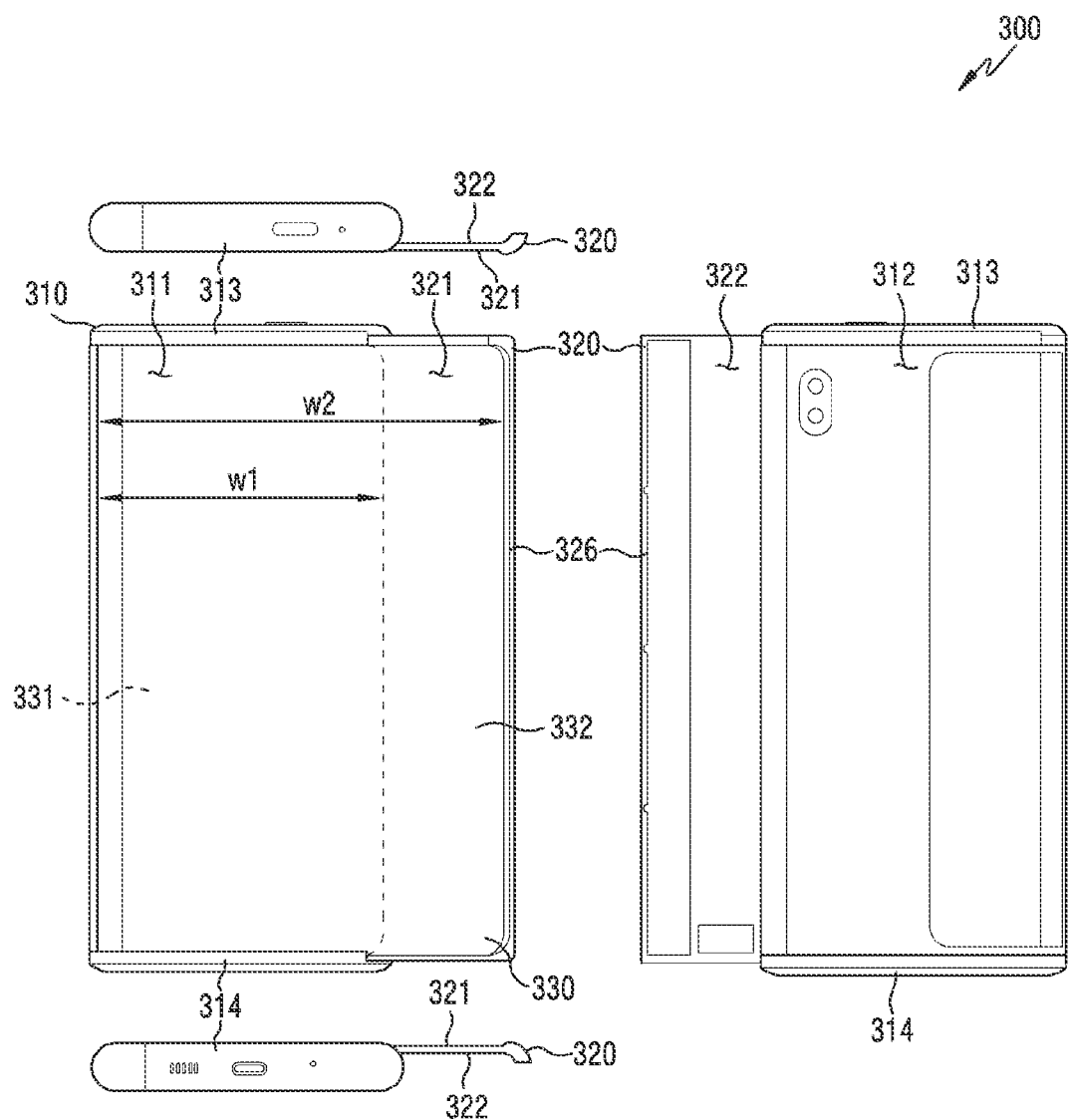
FIG. 4 is a diagram illustrating an electronic device when the flexible display is in a second state, according to an embodiment.
Figure 5:
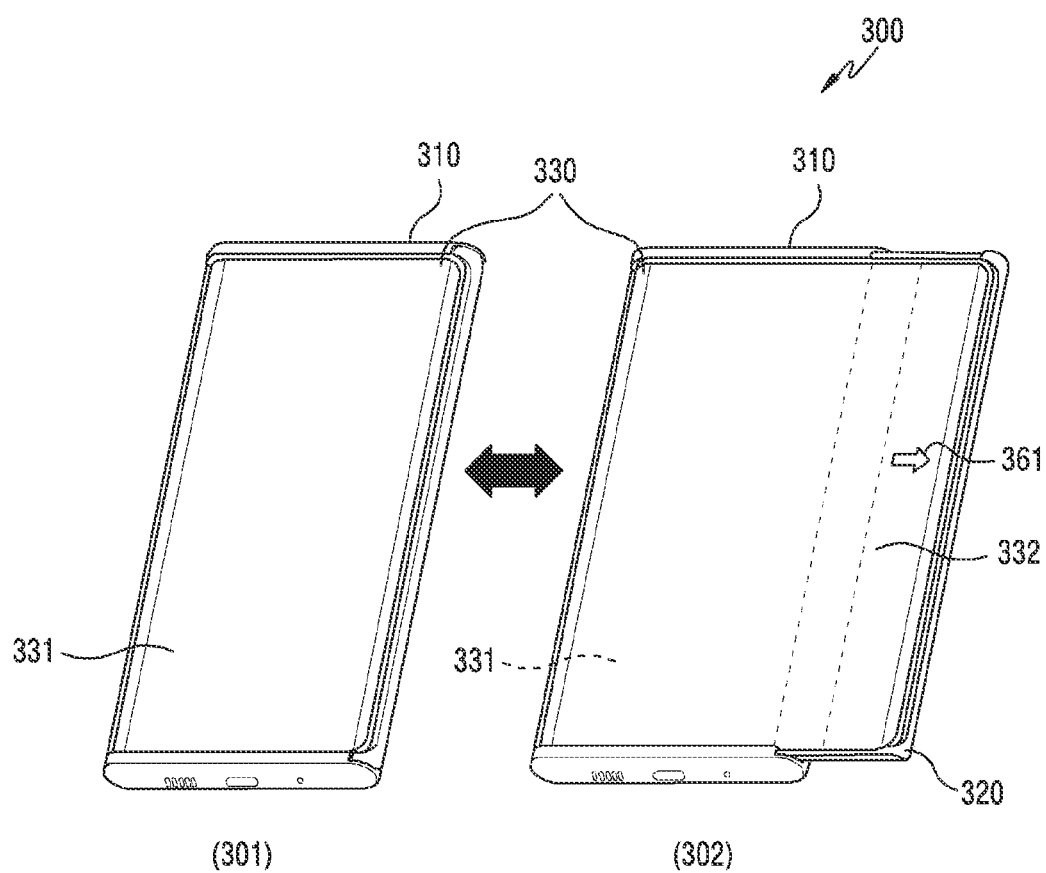
FIG. 5 is a diagram with a front side perspective view of an electronic device illustrating a state change of the flexible display, according to an embodiment.
Figure 6:
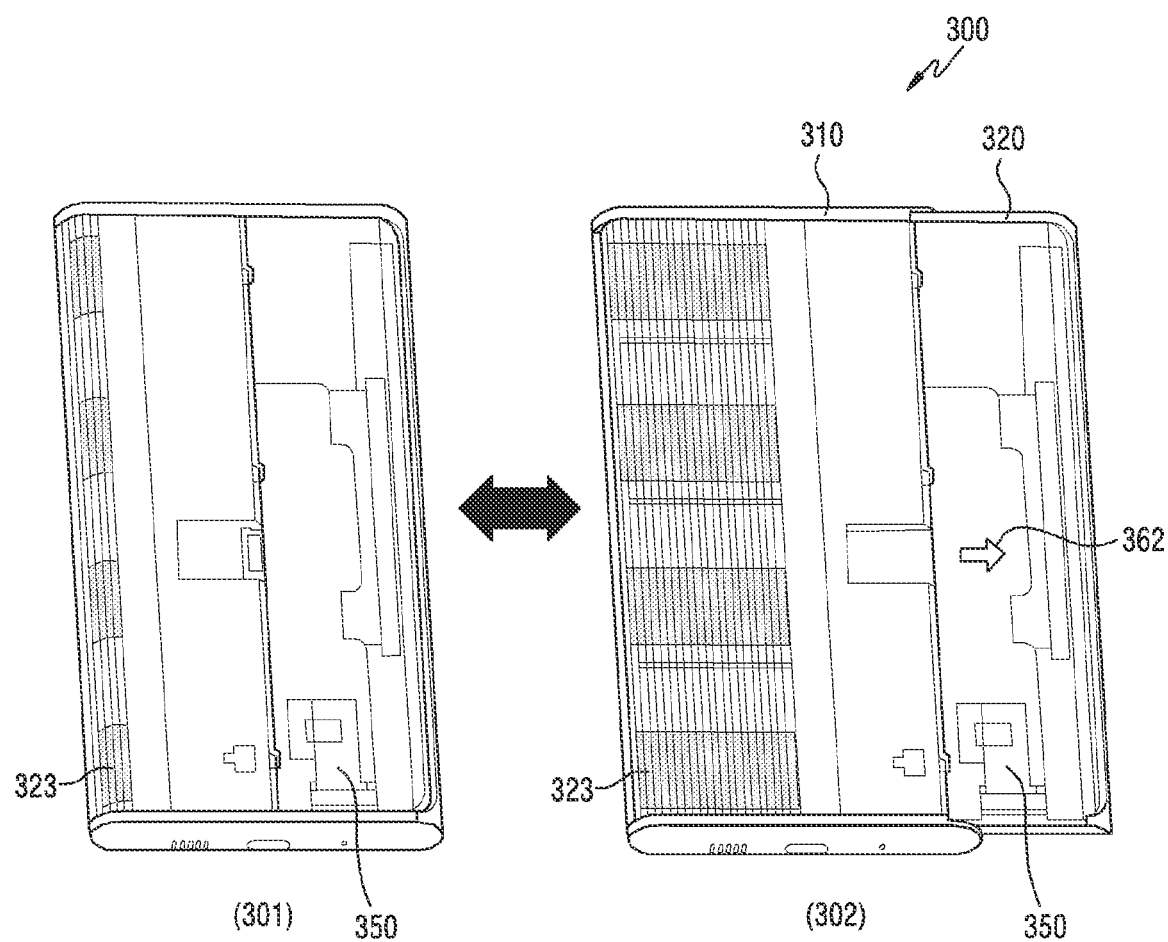
FIG. 6 is diagram of a rear side perspective view of an electronic device illustrating a state change of the flexible display, according to an embodiment.

FIG. 3 is a diagram illustrating an electronic device when a flexible display is in a first state, according to an embodiment. FIG. 4 is a diagram illustrating an electronic device when the flexible display is in a second state, according to an embodiment. FIG. 5 is a diagram with a front side perspective view of an electronic device illustrating a state change of the flexible display, according to an embodiment. FIG. 6 is diagram of a rear side perspective view of an electronic device illustrating a state change of the flexible display, according to an embodiment.

Referring to FIGS. 3 to 6, the electronic device 300 may include a housing 310 including a first surface (or a front surface 311), a second surface (or a rear surface 312), and side surfaces 313, 314, 315, and 316, which at least partially surround the space between the first surface 311 and the second surface 312. The housing 310 may refer to a structure that forms a portion of the first surface 311, the second surface 312, and the side surfaces 313, 314, 315, and 316. At least a portion of the first surface 311 may be defined by a substantially transparent front plate (e.g., a glass plate or a polymer plate including various coating layers). The second surface 312 may be defined by a substantially opaque rear plate. The rear plate may be made of coated or colored glass, ceramics, polymer, metal (e.g., aluminum, stainless steel, or magnesium), or a combination of at least two of these materials. The side surfaces 313, 314, 315, and 316 are coupled to the front plate and the rear plate, and may be defined by a side bezel structure (or a side member) including a metal and/or a polymer. Among the side surfaces 313, 314, 315, and 316, a first side surface (or the top surface) 313 and a second side surface (or the bottom surface) 314 may each have a shape of a cover. Among the side surfaces 313, 314, 315, and 316, a third side surface (or a left surface) 315 may be defined by a seamless extending portion of the front plate, which is bent toward the rear plate. Among the side surfaces 313, 314, 315 and 316, a fourth side surface (or a right surface) 316 may be defined by the side surface 326 of the slide plate 320, which is coupled to be movable through the sliding operation between the front plate and the rear plate, and the seamless extending portion of the front plate, which is bent toward the rear plate.

The flexible display 330 may be visually exposed to the outside through a substantial portion of the front plate. The flexible display 330 may be movably coupled to the housing 310. The flexible display 330 may be coupled to the front surface 321 of the slide plate 320, and at least a portion of the display area may be selectively visually exposed to the outside by the sliding operation of the slide plate 320.

In the state in which at least a portion of the slide plate 320 is retracted into the inside of the housing 310 (e.g., the state illustrated in FIG. 3 and the first state 301 in FIGS. 5 and 6), that is, the state in which the hinge member 323 (e.g., the hinge member 231 in FIG. 2) of the slide plate 320 is rolled into the inside of the housing 310, at least a portion of the flexible display 330 may have a display area 331 of a first size (e.g., a first width w1) because at least a portion of the flexible display 330 is located inside the housing 310 and is not exposed to the outside. In the state in which at least a portion of the slide plate 320 is drawn out to the outside of the housing 310 (e.g., the state illustrated in FIG. 4 and the second state 302 in FIGS. 5 and 6), that is, the state in which the hinge member 323 of the slide plate 320 is spread in the outward direction 362 from the housing 310, the flexible display 330 may have a display area 332 of a second size (e.g., a second width w2) larger than the first size because a portion that has moved in a direction substantially the same as the outward direction 362 has not been exposed to the outside is exposed to the outside.

Each of FIGS. 3 to 6 illustrates the state in which the flexible display 330 is expanded and contracted in one lateral direction (e.g., rightward (361) or leftward), but is not limited thereto. The flexible display 330 may be in the state in which the flexible display 330 is expanded and contracted in a direction substantially perpendicular to the one side surface (e.g., upward (or downward)). The first size of the display area 331 in the first state 301 may correspond to a first height, and the second size of the display area 332 in the second state 302 may correspond to a second height. Alternatively, the first size of the display area 331 in the first state 301 may correspond to a first area corresponding to the first width and the first height, and the second size of the display area 332 in the second state 302 may correspond to a second area corresponding to the second width and the second height. In other words, the first state 301 indicates the state in which the display area of the flexible display 330 is contracted, and the second state 302 indicates the state in which the display area of the flexible display 330 is expanded.

The change of the state of the flexible display 330 (e.g., the first state 301 or the second state 302) may be performed by the sliding operation of the slide plate 320 according to the rotation of a roller connected to (or in contact with) the hinge member 323 of the slide plate 320. The roller may perform the rotating operation in response to driving of an actuator, such as a motor, under the control of a processor. When the roller rotates in a first direction in response to driving of the actuator, the hinge member 323 may be rolled into the inside of the housing 310 along the outer peripheral surface of the roller. As a result, it is possible to contract the display area of the flexible display 330, which is visually exposed to the outside. Alternatively, when the roller rotates in a second direction opposite to the first direction in response to driving of the actuator, the hinge member 323 may be spread toward the outside of the housing 310 along the outer peripheral surface of the roller. As a result, the display area of the flexible display 330, which is visually exposed to the outside, is capable of being expanded.

The flexible display 330 may be electrically connected to a display driver IC (DDI). The DDI may be disposed on a flexible PCB 350 disposed on the rear surface of the slide plate 320.

Figure 7:
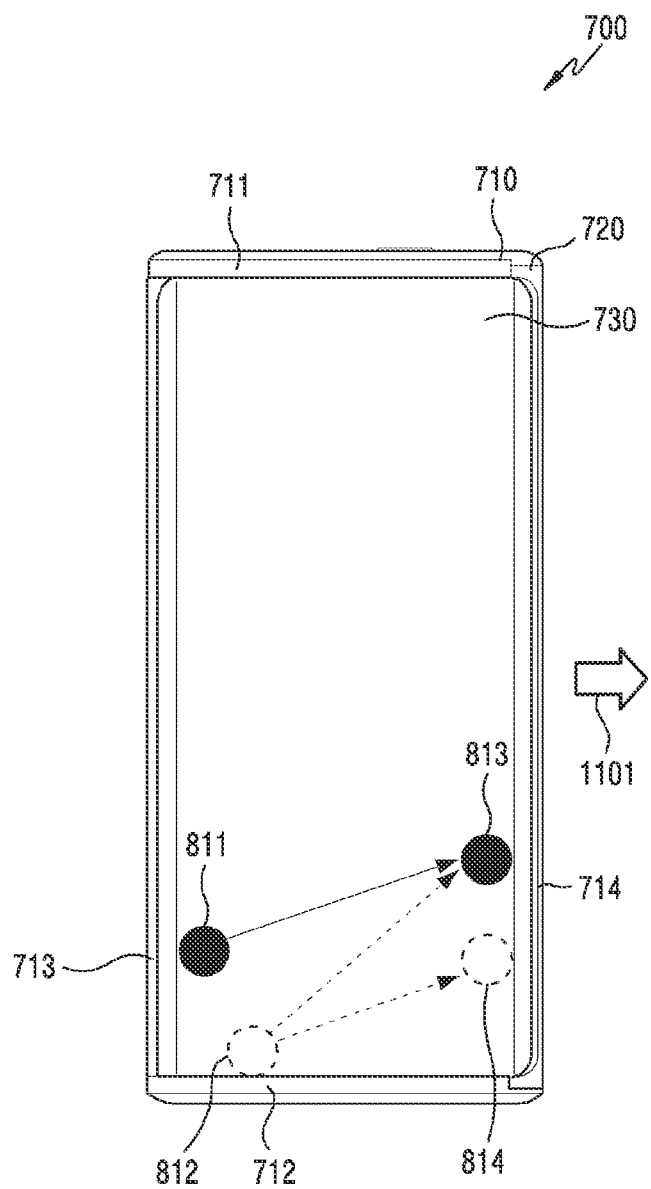
FIG. 7 is a diagram illustrating a moving condition for a touch point of a touch input for changing a flexible display from a first state to a second state, according to an embodiment.

FIG. 7 is a diagram illustrating a moving condition for a touch point of a touch input for changing a flexible display from a first state to a second state, according to an embodiment.

Referring to FIG. 7, an electronic device 700 may include a flexible display 730, an actuator driven to change the state of the flexible display 730, and a processor operatively connected to the flexible display 730 and the actuator. In the following description, the housing 710 of the electronic device 700 will be described as including a first side surface 711 (e.g., the top surface), a second side surface 712 (e.g., the bottom surface), a third side surface 713 (e.g., the left surface), and a fourth side surface 714 (e.g., the right surface).

The display area of the flexible display 730 may be expanded or contracted through the sliding operation of the slide plate 720 connected to the flexible display 730. The state in which the slide plate 720 is retracted into the housing 710 may be a first state (or a contracted state) in which the display area of the flexible display 730 has a first size. In the state in which at least a portion of the slide plate 720 is drawn out to the outside of the housing 710, the display area of the flexible display 730 may be expanded in the direction 1101 in which the slide plate 720 is drawn out, and may be in a second state (or an expanded state) in which the display area has a second size larger than the first size.

The processor may detect touch input on the display area of the flexible display 730. The processor may detect touch input on the display area through the flexible display 730. The processor may detect touch input through a separate touch sensor. In the state in which the touch input is maintained, the processor identifies whether the touch point of the touch input is moved by a specified distance or more on the display area, and based on identifying that the touch point is moved by the specified distance or more, the actuator may be driven so as to change the state of the flexible display 730. When the touch input is a drag input and the drag distance of the drag input is greater than or equal to the specified distance, the processor may perform control such that the state of the flexible display 730 is changed.

In the first state (or the state in which the display area is contracted) of the flexible display 730, when the touch point of the detected touch input starts from a first point 811 (or a second point 812) on the display area and ends at a third point 813 (or a fourth point 814) on the display area which is spaced apart from the first point 811 (or the second point 812) by a specified distance or more, the processor may drive the actuator so as to change the state of the flexible display 730 from the first state to the second state (or the state in which the display area is expanded). Here, the first point 811 may be located adjacent to the third side surface 713 of the housing 710 in a direction opposite to the direction 1101 in which the slide plate 720 is drawn out (or the direction in which the display area is expanded), the second point 812 may be located adjacent to the second side surface 712 of the housing 710 in a direction substantially perpendicular to the direction 1101 in which the slide plate 720 is drawn out while being located adjacent to the third side surface 713, and the third point 813 and the fourth point 814 may be located adjacent to the fourth side surface 714 of the housing 710 in the direction 1101 in which the slide plate 720 is drawn out.

In the description, the first point 811 being "located adjacent to" the third side surface 713 of the housing 710 in the direction opposite to the direction 1101, in which the slide plate 720 is drawn out (or the direction in which the display area is expanded), may mean that the first point 811 is "located closer to the third side surface 713" than the fourth side surface 714 in the direction 1101 in which the slide plate 720 is drawn out (or the display area is expanded) or "located to be in contact with the third side surface 713".

The processor may set (or identify) an end point of the touch point based on the start point of the touch point. When the start point of the touch point is located at a position adjacent to the second side surface 712 (e.g., the second point 812), the processor may also set (or identify) the end point of the touch point at a position located relatively close to the second side surface 712 (e.g., the fourth point 814 rather than the third point 813).

The processor may set (or identify) the end point of the touch point according to the start point of the touch point based on a characteristic (e.g., the length) of a touch object (e.g., a user's finger). Even when the start point of the touch point is located at a position adjacent to the second side surface 712 (e.g., the second point 812), the processor may set (or identify) the end point of the touch point at the third point 813, which is located relatively far from the second side surface 712, rather than the fourth point 814 in consideration of the length of the user's finger.

In the first state of the flexible display 730, when the touch point of the detected touch input starts from the first point 811, which is located adjacent to the third side surface 713 of the housing 710 in a direction opposite to the direction 1101 in which the slide plate 720 is drawn out, or from the second point 812, which is located adjacent to the second side surface 712 of the housing 710 in a direction substantially perpendicular to the direction 1101 in which the slide plate 720 is drawn out while being located adjacent to the third side surface 713, and ends at the third point 813 or the fourth point 814, which is located adjacent to the fourth side surface 714 of the housing 710 in the direction 1101 in which the slide plate 720 is drawn out, the processor may drive the actuator so as to change the state of the flexible display 730 from the first state to the second state. Regardless of the moving distance of the touch input, that is, the distance by which the touch point has moved (e.g., the drag distance), when the touch point starts from a position adjacent to the third side surface 713 or the second side surface 712 and ends at a position adjacent to the fourth side surface 714, the processor may perform control so as to change the state of the flexible display 730.

In the above description, the state in which each of the start point of the touch point (e.g., the first point 811 or the second point 812) and the end point (e.g., the third point 813 or the fourth point 814) is a point of the display area adjacent to a side surface of the housing 710 has been described, but this disclosure is not limited thereto. The touch input may be detected in a side bezel area of the housing 710. At least one of the start point and the end point of the touch point may be included in a bezel area formed on at least one of the third side surface 713, the second side surface 712, and the fourth side surface 714.

Figure 8:
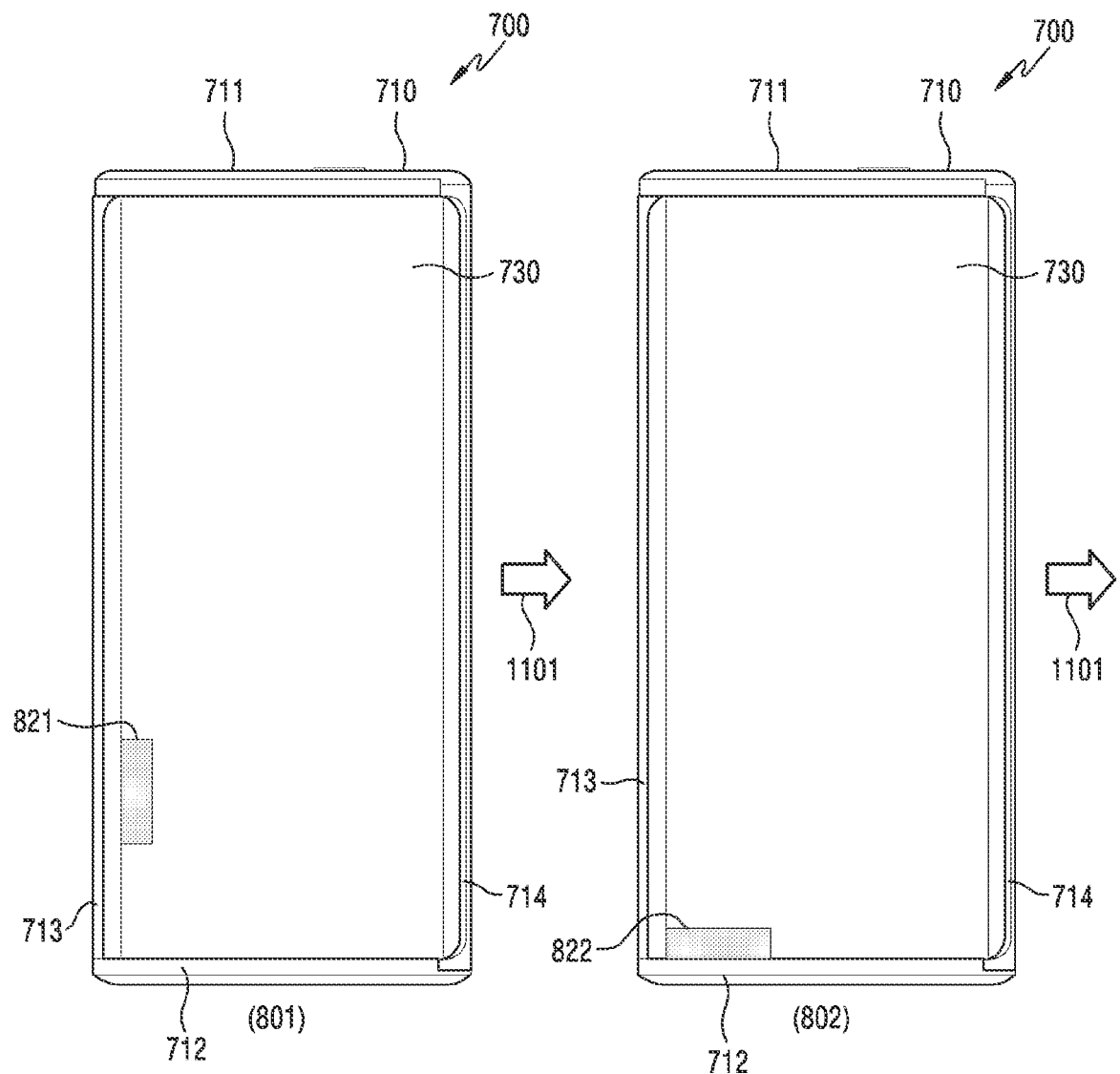
FIG. 8 is a diagram illustrating a method of displaying an object related to a state change of a flexible display on a screen in a first state of the flexible display, according to an embodiment.

FIG. 8 is a diagram illustrating a method of displaying an object related to a state change of a flexible display on a screen in a first state of the flexible display, according to an embodiment.

Referring to FIG. 8, an electronic device 700 may display an object related to a state change of a flexible display 730 on the display area of the flexible display 730.

The processor of the electronic device 700 may display, on the display area, objects 821 and 822 for guiding a touch input for changing the state of the flexible display 730. Before detecting a touch input of the flexible display 730, the processor may display, on the display area, the objects 821 and 822 for guiding the user who wants to change the state of the flexible display 730 to make a touch input at a designated position. In the first display state 801, the processor may display a first object 821 at a first point 811 of the display area, which is located adjacent to the third side surface 713 of the housing 710 in the direction opposite to the direction 1101 in which the slide plate 720 is drawn out. In the second display state 802, the processor may display a second object 822 at a second point 812 of the display area, which is located adjacent to the second side surface 712 of the housing 710 in the direction substantially perpendicular to the direction 1101 in which the slide plate 720 is drawn out while being located adjacent to the third side surface 713. The processor may display the first object 821 at the first point 811 of the display area, and may display the second object 822 at the second point 812 of the display area. Accordingly, the user who wants to change the state of the flexible display 730 may easily make a touch input at the display position of at least one of the first object 821 and the second object 822, and may easily recognize the direction 1101 in which the display area of the flexible display 730 is expanded based on the display position of at least one of the first object 821 and the second object 822.

The first point 811 of the display area adjacent to the third side surface 713 of the housing 710 in the direction opposite to the direction 1101 in which the slide plate 720 is drawn out may include multiple points. The first point 811 may be multiple points or areas including at least a portion of the display area adjacent to the third side surface 713 of the housing 710 in the direction opposite to the direction 1101 in which the slide plate 720 is drawn out.

Figure 9:
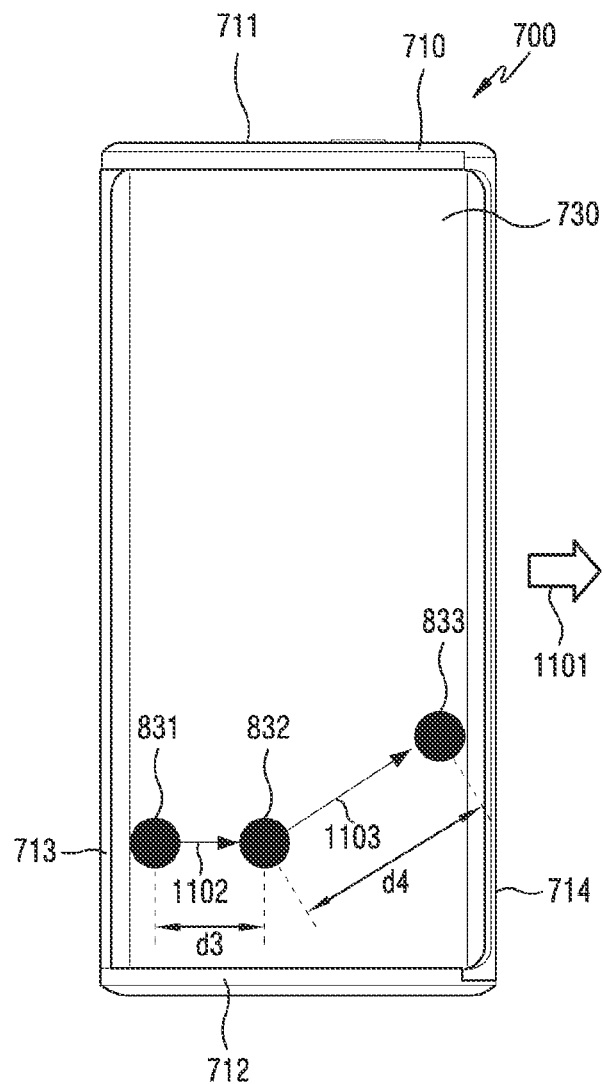
FIG. 9 is a diagram illustrating another moving condition for a touch point of a touch input for changing a flexible display from a first state to a second state, according to an embodiment.

FIG. 9 is a diagram illustrating another moving condition for a touch point of a touch input for changing a flexible display from a first state to a second state, according to an embodiment.

Referring to FIG. 9, in an electronic device 700, the state of a flexible display 730 may be changed by driving an actuator based on a touch input detected on the display area of the flexible display 730. The processor of the electronic device 700 may change the state of the flexible display 730 from a first state in which the display area of the flexible display 730 is contracted to a second state in which the display area of the flexible display 730 is expanded by driving the actuator.

The processor may drive the actuator so as to change the state of the flexible display 730 based on identifying that the moving direction of a touch input for driving the actuator is changed at least once. In the first state, when the moving direction of the touch input is changed and the touch point passes through a seventh point 832 of the display area on the path in which the touch point of the touch input moves from a fifth point 831 of the display area (e.g., the first point 811 or the second point 812) to a sixth point 833 of the display area (e.g., the third point 813 or the fourth point 814), the processor may drive the actuator so as to change the state of the flexible display 730 from the first state to the second state. The figure illustrates the state in which the fifth point 831 is located adjacent to the third side surface 713 of the housing 710 in the direction opposite to the direction 1101 in which the display area of the flexible display 730 is expanded (or the direction in which the slide plate 720 is drawn out) and the sixth point 833 is located adjacent to the fourth side surface 714 of the housing 710 in the direction 1101 in which the display area of the flexible display 730 is expanded, but this disclosure is not limited thereto. The fifth point 831 may be located adjacent to the second side surface 712 of the housing 710 in a direction substantially perpendicular to the direction 1101 in which the display area of the flexible display 730 is expanded while being located adjacent to the third side surface 713 of the housing 710 like the second point 812 in FIG. 7.

When the direction 1102 in which the touch point moves from the fifth point 831 to the seventh point 832 and the direction 1103 in which the touch point moves from the seventh point 832 to the sixth point 833 are different from each other, the processor may identify that the moving direction of the touch input has been changed. In some embodiments, when an angle formed by a virtual line extending from the fifth point 831 to the seventh point 832 and a virtual line extending from the seventh point 832 to the sixth point 833 is greater than or equal to a specified size, the processor may identify that the moving direction of the touch input has been changed.

There may be at least one seventh point 832, which is an inflection point at which the moving direction of the touch input is changed. When there is only one seventh point 832 on the touch path from the fifth point 831 to the sixth point 833, the moving direction of the touch input may be changed once, and when there are multiple seventh points 832 on the touch path from the fifth point 831 to the sixth point 833, the moving direction of the touch input may be changed at least twice.

By driving the actuator so as to change the state of the flexible display 730 based on identifying that the moving direction of the touch input is changed, it is possible to suppress a malfunction due to the state change of the flexible display 730. The processor may suppress a malfunction that may occur in the process of identifying whether the touch input is a touch input for changing the state of the flexible display 730 or a touch input for performing a general function.

Figure 10:
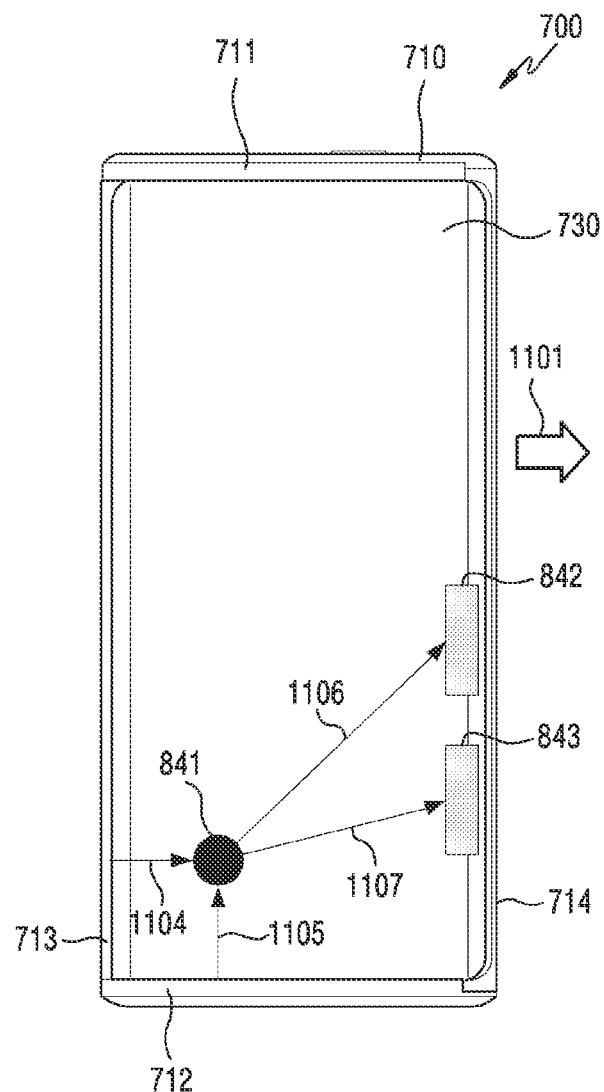
FIG. 10 is a diagram illustrating a method of displaying another object related to a state change of a flexible display on a screen in a first state of the flexible display, according to an embodiment.

FIG. 10 is a diagram illustrating a method of displaying another object related to a state change of a flexible display on a screen in a first state of the flexible display, according to an embodiment.

Referring to FIG. 10, an electronic device 700 may display an object related to a state change of a flexible display 730 on the display area of the flexible display 730.

The processor of the electronic device 700 may display, on the display area, objects 841, 842, and 843 for guiding a touch input for changing the state of the flexible display 730. The processor may display the objects 841, 842, and 843 at one or more points on a touch path on which the touch input is to be input. In the first state of the flexible display 730, when the touch point of the touch input starts from a point of the display area (e.g., the first point 811), which is located adjacent to the third side surface 713 of the housing 710 in a direction opposite to the direction 1101 in which the display area of the flexible display 730 is expanded, or from a point of the display area (e.g., the second point 812), which is located adjacent to the second side surface 712 of the housing 710 in a direction substantially perpendicular to the direction 1101 in which the display area of the flexible display 730 is expanded while being located adjacent to the third side surface 713, the processor may display a third object 841 at the next point of the display area (e.g., the seventh point 832) to which the touch input is to be moved. That is, when the touch point is located at a fifth point 831 (e.g., the first point 811 or the second point 812) corresponding to the start point on the touch path, the processor may display the third object 841 at the seventh point 832.

When there are multiple seventh points 832, that is, there are multiple seventh points 832 on a touch path on which the touch input is to be made (e.g., the path starting from the fifth point 831 (e.g., the first point 811 or the second point 812) corresponding to the start point to the sixth point 833 (e.g., the third point 813 or the fourth point 814) corresponding to the end point), the processor may sequentially display multiple third objects 841 along the positions of the touch point. When the touch point is located at the fifth point 831, the processor may display a first third object at a first seventh point corresponding to the next point on the touch path, and when the touch point is located at the first seventh point, the processor may display a second third object at a second seventh point corresponding to the next point on the touch path.

When the touch point is located at the seventh point 832 corresponding to an inflection point on the touch path, the processor may display fourth object (a first fourth object 842 or a second fourth object 843) at the sixth point 833 (the third point 813 or the fourth point 814) corresponding to an end point on the touch path of the touch input. When the touch point is located at an n-th seventh point 832, which is the last inflection point at which the moving direction of the touch input is changed on the touch path, the processor may display the fourth object at the sixth point 833 corresponding to the end point on the touch path of the touch input. Here, n is a natural number, which may represent that there is at least one seventh point 832. Accordingly, the user may easily make a touch input at the display positions of the at least one third object 841 and the fourth object, and may easily recognize the direction 1101 in which the display area of the flexible display 730 is expanded based on the display positions of the at least one third object 841 and the fourth object.

The processor may set (or identify) the end point of the touch point based on the start point of the touch point. When the start point of the touch point is located at a position adjacent to the third side surface 713 (e.g., the first point 811), the processor may also set (or identify) the end point of the touch point at a position located relatively far from the second side surface 712 (e.g., at the third point 813 rather than the fourth point 814) among the areas located adjacent to the fourth side surface 714. In this case, the processor may display the first fourth object 842 at the third point 813. Accordingly, when the start point of the touch point is the first point 811, it may be easy for the user to move the touch input in the direction 1104 from the first point 811 toward the seventh point 832 at which the third object 841 is displayed and then to move the touch input in the direction 1106 from the seventh point 832 toward the third point 813 at which the first fourth object 842 is displayed. When the start point of the touch point is located at a position adjacent to the second side surface 712 (e.g., the second point 812), the processor may also set (or identify) the end point of the touch point at a position located relatively close to the fourth side surface 714 (e.g., at the fourth point 814 rather than the third point 813) among the areas located adjacent to the fourth side surface 714. In this case, the processor may display the second fourth object 843 at the fourth point 814. Accordingly, when the start point of the touch point is the second point 812, it may be easy for the user to move the touch input in the direction 1105 from the second point 812 toward the seventh point 832 at which the third object 841 is displayed and then to move the touch input in the direction 1107 from the seventh point 832 toward the fourth point 814 at which the second fourth object 843 is displayed.

When the touch point is located at the fifth point 831 (e.g., the first point 811 or the second point 812) corresponding to the start point, the processor may not display the third object 841 at the seventh point 832 corresponding to an inflection point on the touch path and may display the fourth object at the sixth point 833 (e.g., the third point 813 or the fourth point 814) corresponding to the end point on the touch path.

Figure 11:
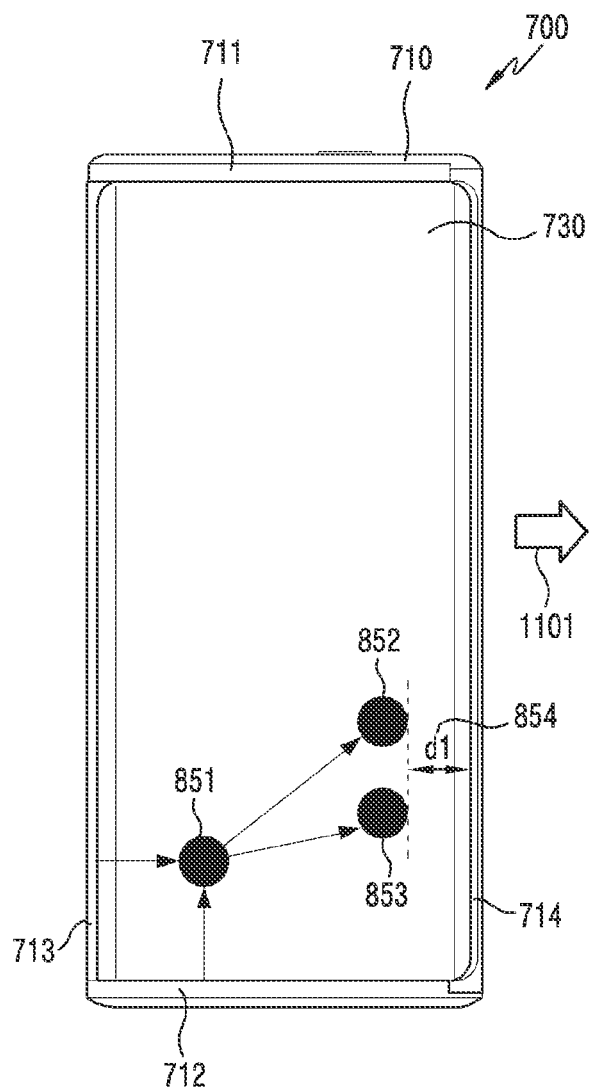
FIG. 11 is a diagram illustrating another moving condition for a touch point of a touch input for changing a flexible display from a first state to a second state, according to an embodiment.

FIG. 11 is a diagram illustrating another moving condition for a touch point of a touch input for changing a flexible display from a first state to a second state, according to an embodiment.

Referring to FIG. 11, in an electronic device 700, the state of a flexible display 730 may be changed by driving an actuator based on a touch input detected on the display area of the flexible display 730. The processor of the electronic device 700 may change the state of the flexible display 730 from a first state in which the display area of the flexible display 730 is contracted to a second state in which the display area of the flexible display 730 is expanded by driving the actuator.

In the process of identifying the touch path of the touch input, when the end point 852 or 853 on the touch path enters a specified distance (d1) 854 from the fourth side surface 714 of the housing 710 in the direction 1101 in which the display area of the flexible display 730 is expanded, the processor may drive the actuator so as to change the state of the flexible display 730 from the first state to the second state. When the touch point of the touch input starts from a start point (e.g., the first point 811 or the second point 812) and moves, and thus the distance between the touch point and the fourth side surface 714 enters the distance 854, the processor may drive the actuator so as to change the state of the flexible display 730 from the first state to the second state even if the end point 852 or 853 of the touch point is not moved to a position adjacent to the fourth side surface 714 (e.g., the third point 813 or the fourth point 814).

Figure 12:
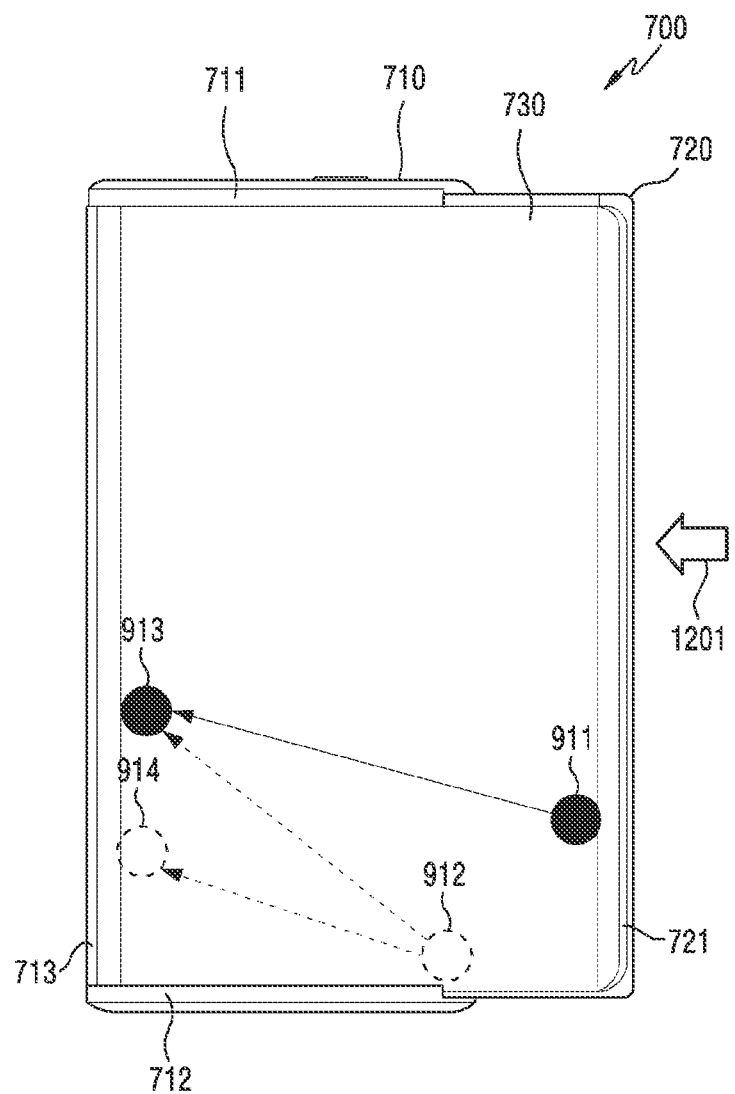
FIG. 12 is a diagram illustrating a moving condition for a touch point of a touch input for changing a flexible display from a second state to a first state, according to an embodiment.

FIG. 12 is a diagram illustrating a moving condition for a touch point of a touch input for changing a flexible display from a second state to a first state, according to an embodiment.

Referring to FIG. 12, an electronic device 700 may include a flexible display 730, an actuator driven to change the state of the flexible display 730, and a processor operatively connected to the flexible display 730 and the actuator. In the following description, the housing 710 of the electronic device 700 will be described as including a first side surface 711 (e.g., the top surface), a second side surface 712 (e.g., the bottom surface), a third side surface 713 (e.g., the left surface), and a fourth side surface 714 (e.g., the right surface).

The display area of the flexible display 730 may be expanded or contracted through the sliding operation of the slide plate 720 connected to the flexible display 730. The state in which the slide plate 720 is retracted into the housing 710 may be in a first state (or a contracted state) in which the display area of the flexible display 730 has a first size. In the state in which at least a portion of the slide plate 720 is drawn out to the outside of the housing 710, the display area of the flexible display 730 may be expanded in the direction 1101 in which the slide plate 720 is drawn out, and may be in a second state (or an expanded state) in which the display area has a second size larger than the first size.

The processor may detect a touch input on the display area of the flexible display 730. In the state in which the touch input is maintained, the processor may identify whether the touch point of the touch input is moved by a specified distance or more on the display area, and the processor may drive the actuator so as to change the state of the flexible display 730 based on identifying that the touch point is moved by the specified distance or more. When the touch input is a drag input and the drag distance of the drag input is greater than or equal to the specified distance, the processor may perform control such that the state of the flexible display 730 is changed.

In the second state (or the state in which the display area is expanded) of the flexible display 730, when the touch point of the detected touch input starts from an eighth point 911 (or a ninth point 912) on the display area and ends at a tenth point 913 (or an eleventh point 914) on the display area which is spaced apart from the eighth point 911 (or the ninth point 912) by a specified distance or more, the processor may drive the actuator so as to change the state of the flexible display 730 from the second state to the first state (or the state in which the display area is contracted). Here, the eighth point 911 may be located adjacent to the fourth side surface 714 (corresponding to the first side surface 721 of the slide plate 720 in the state in which the display area is expanded) of the housing 710 in a direction opposite to the direction 1201 in which the slide plate 720 is retracted (or the direction in which the display area is contracted), the ninth point 912 may be located adjacent to the second side surface 712 of the housing 710 (or the second side surface 722 of the slide plate 720) in a direction substantially perpendicular to the direction 1201 in which the slide plate 720 is retracted while being located adjacent to the fourth side surface 714, and the tenth point 913 and the eleventh point 914 may be located adjacent to the third side surface 713 of the housing 710 in the direction 1201 in which the slide plate 720 is retracted.

The processor may set (or identify) an end point of the touch point based on the start point of the touch point. When the start point of the touch point is located at a position adjacent to the second side surface 712 (or the second side surface 722 of the slide plate 720) (e.g., the ninth point 912), the processor may set (or identify) the end point of the touch point at a position located relatively close to the second side surface 712 (e.g., the eleventh point 914 rather than the tenth point 913).

The processor may set (or identify) the end point of the touch point according to the start point of the touch point based on a characteristic (e.g., the length) of a touch object (e.g., a user's finger). Even when the start point of the touch point is located at a position adjacent to the second side surface 712 (or the second side surface 722 of the slide plate 720) (e.g., the ninth point 912), the processor may set (or identify) the end point of the touch point at the tenth point 913, which is located relatively far from the second side surface 712, rather than the eleventh point 914 in consideration of the length of the user's finger.

In the second state of the flexible display 730, when the touch point of the detected touch input starts from the eighth point 911, which is located adjacent to the fourth side surface 714 of the housing 710 (or the first side surface 721 of the slide plate 720) in a direction opposite to the direction 1201 in which the slide plate 720 is retracted, or from the ninth point 912, which is located adjacent to the second side surface 712 of the housing 710 (or the second side surface 722 of the slide plate 720) in a direction substantially perpendicular to the direction 1201 in which the slide plate 720 is retracted while being located adjacent to the fourth side surface 714 (or the first side surface 721 of the slide plate 720), and ends at the tenth point 913 or the eleventh point 914, which is located adjacent to the third side surface 713 of the housing 710 in the direction 1201 in which the slide plate 720 is retracted, the processor may drive the actuator so as to change the state of the flexible display 730 from the second state to the first state. Regardless of the moving distance of the touch input, that is, the distance the touch point is moved (e.g., the drag distance), when the touch point starts from a position adjacent to the fourth side surface 714 (or the first side surface 721 of the slide plate 720) or the second side surface 712 (or the second side surface 722 of the slide plate 720) and ends at a position adjacent to the third side surface 713, the processor may perform control so as to change the state of the flexible display 730.

In the above description, the state in which each of the start point of the touch point (e.g., the eighth point 911 or the ninth point 912) and the end point (e.g., the tenth point 913 or the eleventh point 914) is a point of the display area adjacent to a side surface of the housing 710 (or a side surface of the slide plate 720) has been described, but this disclosure is not limited thereto. The touch input may be detected in a side bezel area of the housing 710 (or the slide plate 720).

Figure 13:
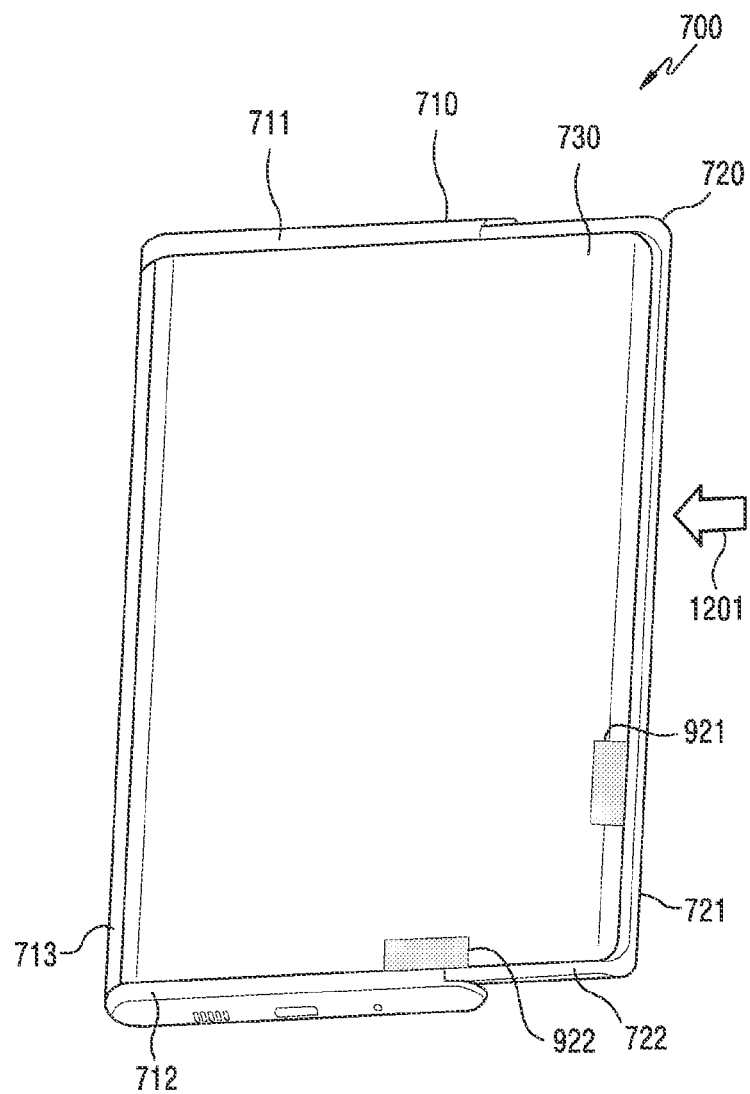
FIG. 13 is a diagram illustrating a method of displaying an object related to a state change of a flexible display on a screen in a second state of the flexible display, according to an embodiment.

FIG. 13 is a diagram illustrating a method of displaying an object related to a state change of a flexible display on a screen in a second state of the flexible display, according to an embodiment.

Referring to FIG. 13, an electronic device 700 may display an object related to a state change of a flexible display 730 on the display area of the flexible display 730.

The processor of the electronic device 700 may display, on the display area, objects 921 and 922 for guiding a touch input for changing the state of the flexible display 730. Before detecting a touch input, the processor may display, on the display area, the objects 921 and 922 for guiding the user who wants to change the state of the flexible display 730 to make a touch input at a designated position. The processor may display a fifth object 921 at an eighth point 911 of the display area adjacent to the fourth side surface 714 of the housing 720 (corresponding to the first side surface 721 of the slide plate 720 in the state in which the display area is expanded) in a direction opposite to the direction 1201 in which the slide plate 720 is retracted. The processor may display a sixth object 922 at a ninth point 912 of the display area, which is located adjacent to the second side surface 712 of the housing 710 (or the second side surface 722 of the slide plate 720) in the direction substantially perpendicular to the direction 1201 in which the slide plate 720 is retracted while being located adjacent to the fourth side surface 714 (or the first side surface 721 of the slide plate 720). The processor may display the fifth object 921 at the eighth point 911 of the display area, and may display the sixth object 922 at the ninth point 912 of the display area. Accordingly, the user who wants to change the state of the flexible display 730 may easily make a touch input at the display position of at least one of the fifth object 921 and the sixth object 922, and may easily recognize the direction 1201 in which the display area of the flexible display 730 is contracted based on the display position of at least one of the fifth object 921 and the sixth object 922.

Figure 14:
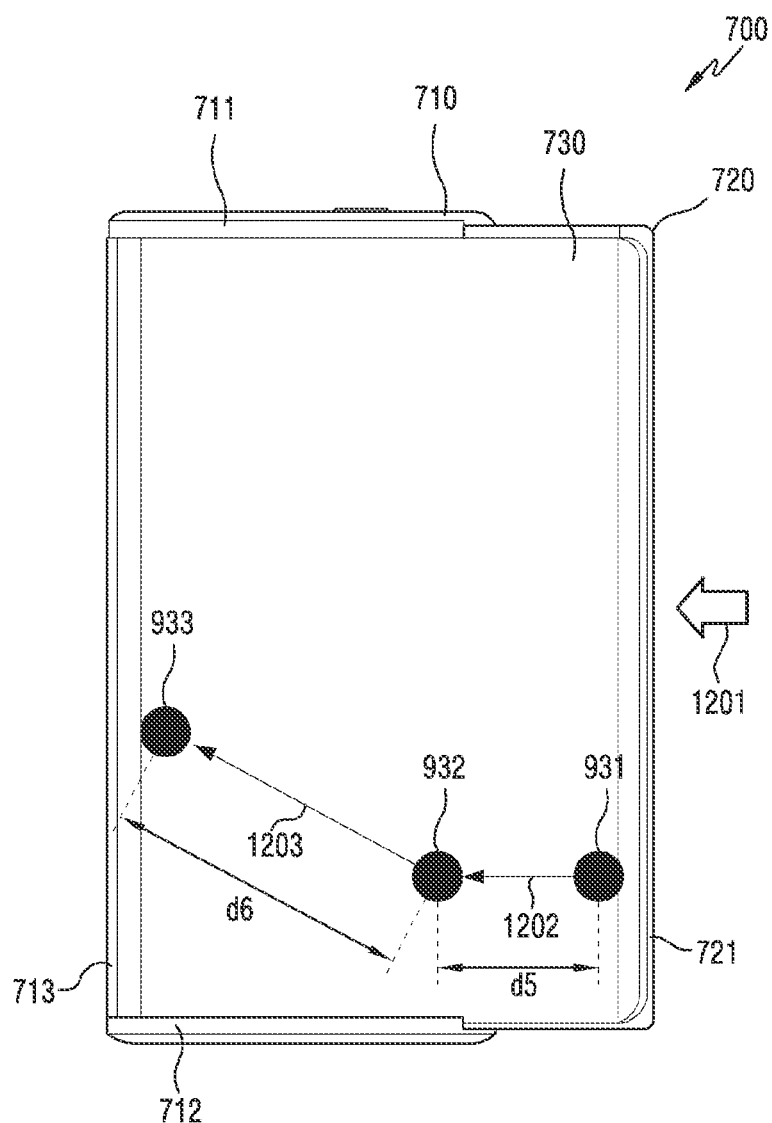
FIG. 14 is a diagram illustrating another moving condition for a touch point of a touch input for changing a flexible display from a second state to a first state, according to an embodiment.

FIG. 14 is a diagram illustrating another moving condition for a touch point of a touch input for changing a flexible display from a second state to a first state, according to an embodiment.

Referring to FIG. 14, in an electronic device 700, the state of a flexible display 730 may be changed by driving an actuator based on a touch input detected on the display area of the flexible display 730. The processor of the electronic device 700 may change the state of the flexible display 730 from a second state in which the display area of the flexible display 730 is expanded to a first state in which the display area of the flexible display 730 is contracted by driving the actuator.

The processor may drive the actuator so as to change the state of the flexible display 730 based on identifying that the moving direction of the touch input for driving the actuator is changed at least once. In the second state, when the moving direction of the touch input is changed and the touch point passes through a fourteenth point 932 of the display area on the path in which the touch point of the touch input moves from a twelfth point 931 of the display area (e.g., the eighth point 911 or the ninth point 912) to a thirteenth point 933 of the display area (e.g., the tenth point 913 or the eleventh point 914), the processor may drive the actuator so as to change the state of the flexible display 730 from the second state to the first state. FIG. 14 illustrates the state in which the twelfth point 931 is located adjacent to the fourth side surface 714 of the housing 710 (corresponding to the first side surface 721 of the slide plate 720 in the state in which the display area is expanded) in the direction opposite to the direction 1201 in which the display area of the flexible display 730 is contracted (or the direction in which the slide plate 720 is retracted) and the thirteenth point 933 is located adjacent to the third side surface 713 of the housing 710 in the direction 1201 in which the display area of the flexible display 730 is contracted, but this disclosure is not limited thereto. The twelfth point 931 may be located adjacent to the second side surface 712 of the housing 710 (or the second side surface 722 of the slide plate 720) in a direction substantially perpendicular to the direction 1201 in which the display area of the flexible display 730 is retracted while being located adjacent to the fourth side surface 714 (or the first side surface 721 of the slide plate 720) similar to the ninth point 912 in FIG. 12.

When the direction 1202 in which the touch point moves from the twelfth point 931 to the fourteenth point 932 and the direction 1203 in which the touch point moves from the fourteenth point 932 to the thirteenth point 933 are different from each other, the processor may identify that the moving direction of the touch input has been changed. When an angle formed by a virtual line extending from the twelfth point 931 to the fourteenth point 932 and a virtual line extending from the fourteenth point 932 to the thirteenth point 933 is greater than or equal to a specified size, the processor may identify that the moving direction of the touch input has been changed.

There may be at least one fourteenth point 932, which is an inflection point at which the moving direction of the touch input is changed. When there is only one fourteen point 932 on the touch path from the twelfth point 931 to the thirteenth point 933, the moving direction of the touch input may be changed once, and when there are multiple fourteenth points 932 on the touch path from the twelfth point 931 to the thirteenth point 933, the moving direction of the touch input may be changed at least twice.

By driving the actuator so as to change the state of the flexible display 730 based on identifying that the moving direction of the touch input is changed, it is possible to suppress a malfunction due to the state change of the flexible display 730. The processor may suppress a malfunction that may occur in the process of identifying whether the touch input is a touch input for changing the state of the flexible display 730 or a touch input for performing a general function.

Figure 15:
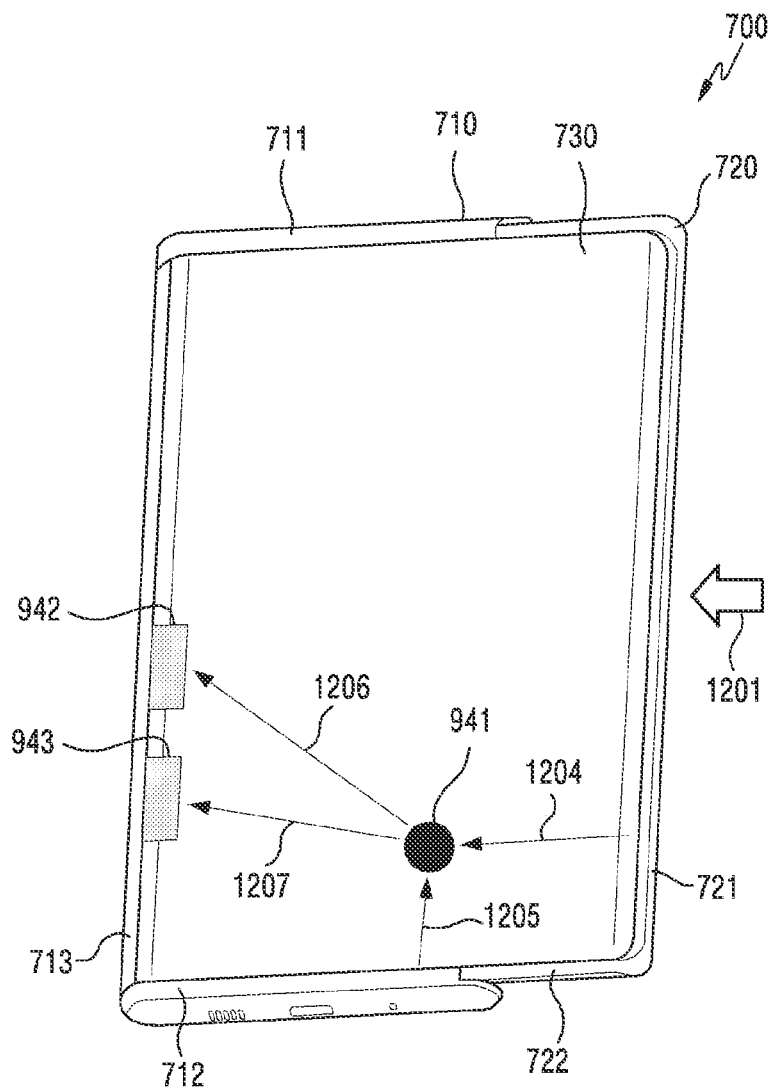
FIG. 15 is a diagram illustrating a method of displaying another object related to a state change of a flexible display on a screen in a second state of the flexible display, according to an embodiment.

FIG. 15 is a diagram illustrating a method of displaying another object related to a state change of a flexible display on a screen in a second state of the flexible display, according to an embodiment.

Referring to FIG. 15, an electronic device 700 may display an object related to a state change of a flexible display 730 on the display area of the flexible display 730.

The processor of the electronic device 700 may display, on the display area, objects 941, 942, and 943 for guiding a touch input for changing the state of the flexible display 730. The processor may display the objects 941, 942, and 943 at one or more points on a touch path on which the touch input is to be input. In the second state of the flexible display 730, when the touch point of the touch input starts from a point of the display area (e.g., the eighth point 911), which is located adjacent to the fourth side surface 714 of the housing 710 (corresponding to the first side surface 721 of the slide plate 720 in the state in which the display area is expanded) in a direction opposite to the direction 1201 in which the display area of the flexible display 730 is contracted, or a point of the display area (e.g., the ninth point 912), which is located adjacent to the second side surface 712 of the housing 710 (or the second side surface 722 of the slide plate 720) in a direction substantially perpendicular to the direction 1201 in which the display area of the flexible display 730 is contracted while being located adjacent to the fourth side surface 714 (or the first side surface 721 of the slide plate 720), the processor may display a seventh object 941 at the next point of the display area (e.g., the fourteenth point 932) to which the touch input is to be moved. That is, when the touch point is located at a twelfth point 931 (e.g., the eighth point 911 or the ninth point 912) corresponding to the start point on the touch path, the processor may display the seventh object 941 at the fourteenth point 932.

When there are multiple fourteenth points 932, that is, there are multiple fourteenth points 932 on a touch path on which the touch input is to be made (e.g., the path starting from the twelfth point 931 (e.g., the eighth point 911 or the ninth point 912) corresponding to the start point to the thirteenth point 933 (e.g., the tenth point 913 or the eleventh point 914) corresponding to the end point), the processor may sequentially display multiple seventh objects 941 along the positions of the touch point. When the touch point is located at the twelfth point 931, the processor may display a first seventh object at a first fourteenth point corresponding to the next point on the touch path, and when the touch point is located at the first fourteenth point, the processor may display a second seventh object at a second fourteenth point corresponding to the next point on the touch path.

When the touch point is located at the fourteenth point 932 corresponding to an inflection point on the touch path, the processor may display eighth object (a first eighth object 942 or a second eighth object 943) at the thirteenth point 933 (e.g., the tenth point 913 or the eleventh point 914) corresponding to an end point on the touch path of the touch input. When the touch point is located at an n-th fourteenth point 932, which is the last inflection point on the touch path at which the moving direction of the touch input is changed, the processor may display the eighth object at the thirteenth point 933 corresponding to an end point on the touch path of the touch input. Here, n is a natural number, which may represent that there is at least one fourteenth point 932. Accordingly, the user may easily make a touch input at the display positions of the at least one seventh object 941 and the eighth object, and may easily recognize the direction 1201 in which the display area of the flexible display 730 is contracted based on the display positions of the at least one seventh object 941 and the eighth object.

The processor may set (or identify) the end point of the touch point based on the start point of the touch point. When the start point of the touch point is located at a position adjacent to the fourth side surface 714 (corresponding to the first side surface 721 of the slide plate 720 in the state in which the display area is expanded) (e.g., the eighth point 911), the processor may also set (or identify) the end point of the touch point at a position located relatively far from the second side surface 712 (e.g., at the tenth point 913 rather than the eleventh point 914) among the areas located adjacent to the third side surface 713. In this case, the processor may display the first eighth object 942 at the tenth point 913. Accordingly, when the start point of the touch point is the eighth point 911, it may be easy for the user to move the touch input in the direction 1204 from the eighth point 911 toward the fourteenth point 932 at which the seventh object 941 is displayed and then to move the touch input in the direction 1206 from the fourteenth point 932 toward the tenth point 913 at which the first eighth object 942 is displayed. When the start point of the touch point is located at a position adjacent to the second side surface 712 (or the second side surface 722 of the slide plate 720) (e.g., the ninth point 912), the processor may also set (or identify) the end point of the touch point at a position located relatively close to the second side surface 712 (e.g., the eleventh point 914 rather than the tenth point 913) among the areas adjacent to the third side surface 713. In this case, the processor may display the second eighth object 943 at the eleventh point 914. Accordingly, when the start point of the touch point is the ninth point 912, it may be easy for the user to move the touch input in the direction 1205 from the ninth point 912 toward the fourteenth point 932 at which the seventh object 941 is displayed and then to move the touch input in the direction 1207 from the fourteenth point 932 toward the eleventh point 914 at which the second eighth object 943 is displayed.

When the touch point is located at the twelfth point 931 (e.g., the eighth point 911 or the ninth point 912) corresponding to the start point, the processor may not display the seventh object 941 at the fourteenth point 932 corresponding to an inflection point on the touch path and may display the eighth object at the thirteenth point 933 (e.g., the tenth point 913 or the eleventh point 914) corresponding to the end point on the touch path.

Figure 16:
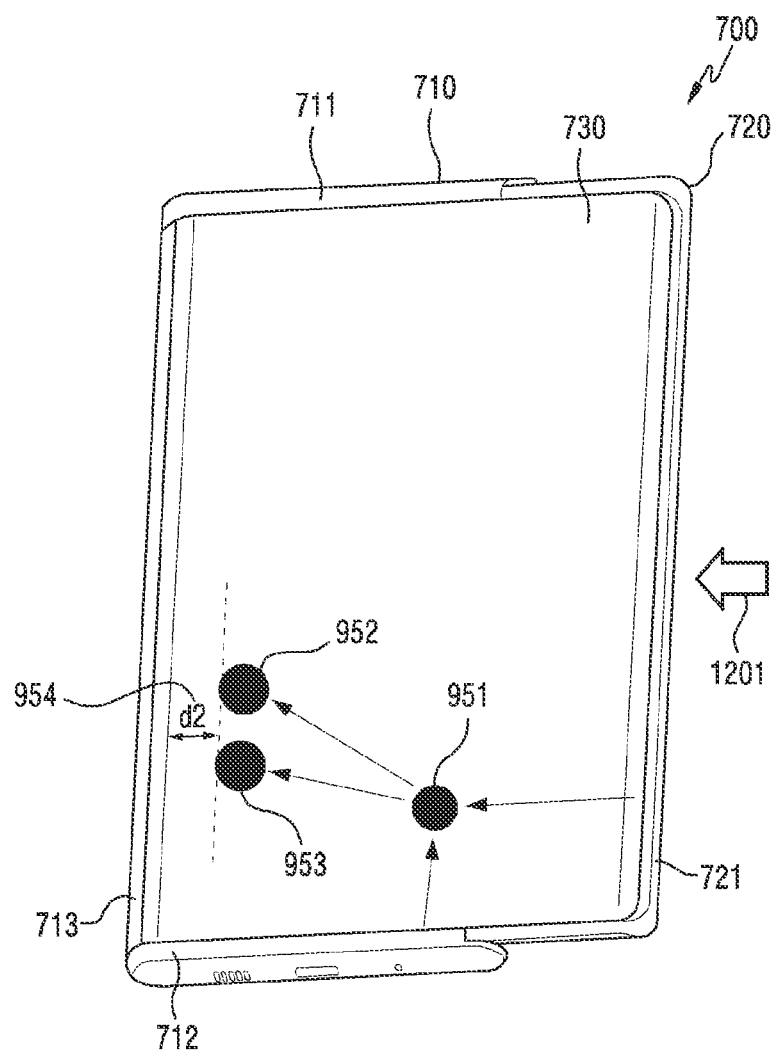
FIG. 16 is a diagram illustrating another moving condition for a touch point of a touch input for changing a flexible display from a second state to a first state, according to an embodiment.

FIG. 16 is a diagram illustrating another moving condition for a touch point of a touch input for changing a flexible display from a second state to a first state, according to an embodiment.

Referring to FIG. 16, in an electronic device 700, the state of a flexible display 730 may be changed by driving an actuator based on a touch input detected on the display area of the flexible display 730. The processor of the electronic device 700 may change the state of the flexible display 730 from a second state in which the display area of the flexible display 730 is expanded to a first state in which the display area of the flexible display 730 is contracted by driving the actuator.

In the process of identifying the touch path of the touch input, when the end point 952 or 953 on the touch path enters a specified distance (d2) 954 from the third side surface 713 of the housing 710 in the direction 1201 in which the display area of the flexible display 730 is contracted, the processor may drive the actuator so as to change the state of the flexible display 730 from the second state to the first state. When the touch point of the touch input starts from a start point (e.g., the eighth point 911 or the ninth point 912) and moves, and thus the distance between the touch point and the third side surface 713 enters the distance 954, the processor may drive the actuator so as to change the state of the flexible display 730 from the second state to the first state even if the end point 952 or 953 of the touch point is not moved to a position adjacent to the third side surface 713 (e.g., the tenth point 913 or the eleventh point 914).

Regarding FIGS. 7 to 16 described above, the touch input for changing the state of the flexible display 730 may include drag input in which the touch point of the touch input is moved while the detected touch input is maintained. However, the touch input is not limited thereto. The touch input may include hovering input that does not come into contact the display area of the flexible display 730.

When the touch input moves a predetermined distance and ends and then another touch input (e.g., a continuous single touch input) is detected within a specified time, the processor may drive the actuator to change the state of the flexible display 730 based on the moving distance of the touch point of the touch input and the moving distance of the touch point of the another touch input. After the touch point of the first touch input is moved by a first distance smaller than a specified distance, the processor may detect the second touch input on the display area within a predetermined time from the time point at which the first touch input is terminated, and may identify a second distance by which the second touch input is moved on the display area in the state in which the second touch input is maintained. In addition, the processor may drive the actuator so as to change the state of the flexible display 730 based on identifying that the sum of the first distance and the second distance is greater than or equal to the specified distance.

In FIGS. 7 to 16 described above, the case in which single touch input made using one finger is used as a touch input for changing the state of the flexible display 730 has been described, but this disclosure is not limited thereto. As in FIGS. 17 and 18 to be described later, it is possible to change the state of the flexible display 730 using a multi-touch input.

Figure 17:
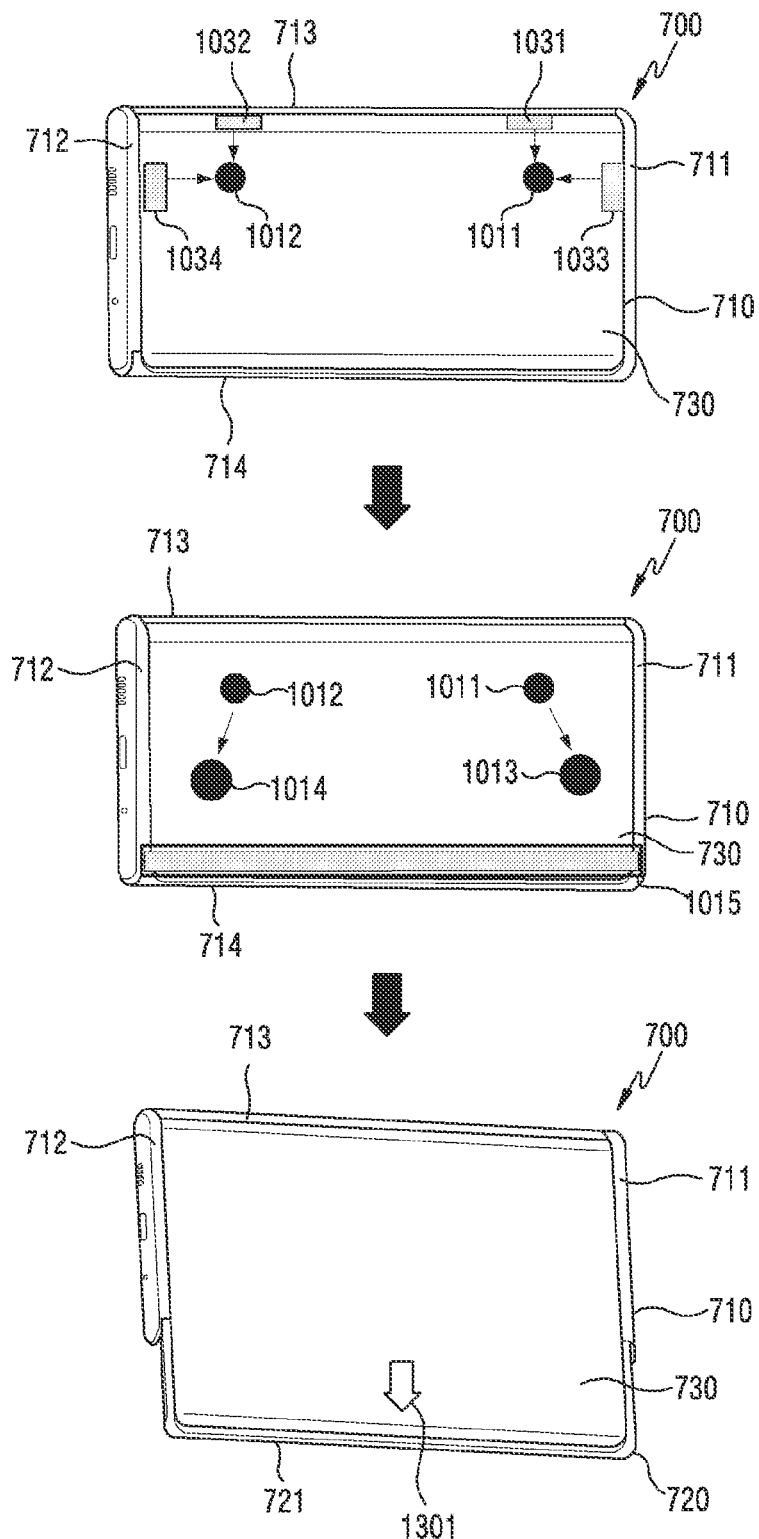
FIG. 17 is a diagram illustrating types of touch inputs for changing a flexible display from a first state to a second state and a moving condition for a touch point of a touch input, according to an embodiment.
Figure 18:
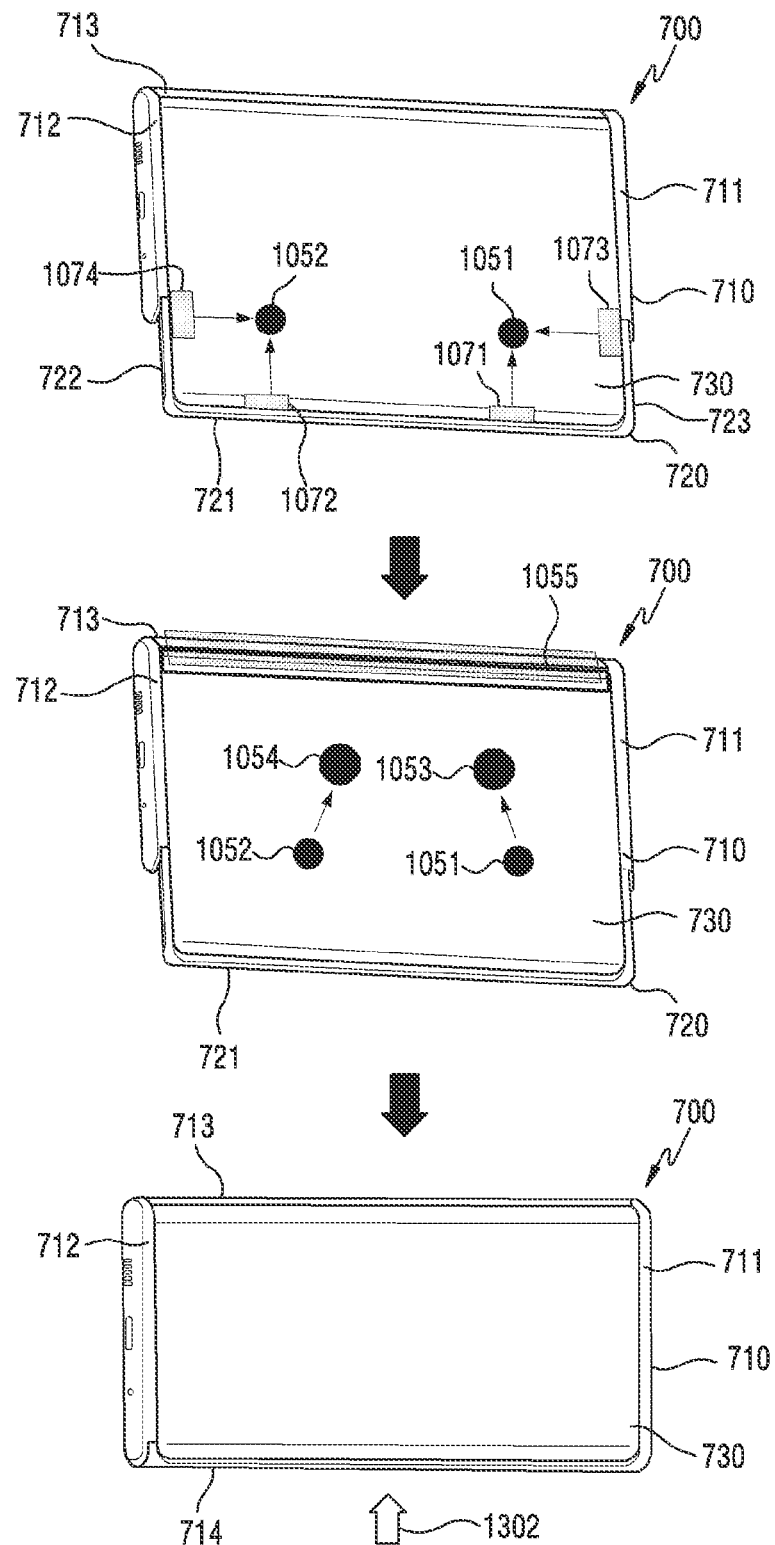
FIG. 18 is a diagram illustrating types of touch inputs for changing a flexible display from a second state to a first state and a moving condition for a touch point of a touch input, according to an embodiment.

FIG. 17 is a diagram illustrating types of touch inputs for changing a flexible display from a first state to a second state and a moving condition for a touch point of a touch input, according to an embodiment. FIG. 18 is a diagram illustrating types of touch inputs for changing a flexible display from a second state to a first state and a moving condition for a touch point of a touch input, according to an embodiment.

Referring to FIGS. 17 and 18, an electronic device 700 may include a flexible display 730, an actuator driven to change the state of the flexible display 730, and a processor operatively connected to the flexible display 730 and the actuator. In the following description, the housing 710 of the electronic device 700 will be described as including a first side surface 711, a second side surface 712, a third side surface 713, and a fourth side surface 714. When the electronic device 700 is in a horizontal mode (e.g., the state in which the display area of the flexible display 730 is displayed to be long in the horizontal direction), the user may hold the electronic device 700 with both hands. In this case, the processor may control a state change of the flexible display 730 in response to a multi-touch input made using fingers of each of both hands. The processor may perform control such that the display area of the flexible display 730 is expanded or contracted by controlling the sliding operation of the slide plate 720 connected to the flexible display 730 using the actuator based on the touch condition of the multi-touch input. Here, the state of the flexible display 730 may include a first state (or a contracted state) in which the display area of the flexible display 730 has a first size and a second state (or an expanded state) in which the display area of the flexible display 730 has a second size larger than the first size.

The processor may detect a multi-touch input (or multiple touch inputs) on the display area of the flexible display 730. The multi-touch input may represent an input in which at least two fingers touch the display area at the same time for at least a predetermined period of time. In the state in which the multi-touch input is maintained, the processor may identify whether the touch points of the multi-touch input are moved by a specified distance or more on the display area, and the processor may drive the actuator so as to change the state of the flexible display 730 based on identifying that the touch points are moved by the specified distance or more.

Referring to FIG. 17, in the first state of the flexible display 730 (or the state in which the display area is contracted), when each of the touch points of the detected multi-touch input starts from a corresponding one of a fifteenth point (a point corresponding to the display position of the ninth object 1031) on the display area and a sixteenth point on the display area (a point corresponding to the display position of the tenth object 1032), and ends at a corresponding one of a seventeenth point 1013 on the display area and an eighteenth point 1014 on the display area, which are spaced apart from the touch points by a distance greater than or equal to the specified distance, the processor may drive the actuator so as to change the state of the flexible display 730 from the first state to the second state. Here, the fifteenth point and the sixteenth point may be located adjacent to the third side surface 713 of the housing 710 in a direction opposite to the direction 1301 in which the slide plate 720 is drawn out (or the direction in which the display area is expanded), and the seventh point 1013 and the eighth point 1014 may be located adjacent to the fourth side surface 714 of the housing 710 in the direction 1301 in which the slide plate 720 is drawn out. Even when each of the touch points of the multi-touch input starts from a corresponding one of a nineteenth point on the display area (a point corresponding to the display position of the eleventh object 1033) and a twentieth point on the display area (a point corresponding to the display position of the twelfth object 1034), the processor may drive the actuator so as to change the state of the flexible display 730 from the first state to the second state when each of the touch points of the multi-touch input is moved by a distance greater than or equal to the specified distance. Here, each of the nineteenth point and the twentieth point may be located adjacent to a corresponding one of the first side surface 711 and the second side surface 712 of the housing 710 in a direction substantially perpendicular to the direction 1301 in which the slide plate 720 is drawn out while being located adjacent to the third side surface 713.

Regardless of the moving distance of the multi-touch input, that is, the distance by which each of the touch points is moved, when each of the touch points starts from a position adjacent to the third side surface 713 or the first side surface 711 (and the second side surface 712) and ends at a position adjacent to the fourth side surface 714 (e.g., a first adjacent area 1015), the processor may perform control so as to change the state of the flexible display 730 from the first state to the second state.

The processor may drive the actuator so as to change the state of the flexible display 730 based on identifying that the moving direction of the multi-touch input for driving the actuator is changed at least once. In the first state, when the moving direction of the multi-touch input is changed and each of the touch points of the multi-touch input passes through a corresponding one of a twenty-first point 1011 and a twenty-second point 1012 of the display area on the path in which the touch points of the multi-touch input are moved, the processor may drive the actuator so as to change the state of the flexible display 730 from the first state to the second state.

There may be at least one twenty-first point 1011 and at least one twenty-second point 1012, which are inflection points at each of which the moving direction of the multi-touch input is changed. When there is only one twenty-first point 1011 on the touch path from the fifteenth point (a point corresponding to the display position of the ninth object 1031) or the nineteenth point (a point corresponding to the display position of the eleventh object 1033)) to the seventeenth point 1013, the moving direction of first touch input (e.g., a touch input made using a finger of the right hand) included in the multi-touch input may be changed once, and when there are multiple twenty-first points 1011 on the touch path from the fifteenth point (or the nineteenth point) to the seventeenth point 1013, the moving direction of the first touch input included in the multi-touch input may be changed at least twice. Similarly, when there is only one twenty-second point 1012 on the touch path from the sixteenth point (a point corresponding to the display position of the tenth object 1032) (or the twentieth point (a point corresponding to the display position of the twelfth object 1034)) to the eighteenth point 1014, the moving direction of the second touch input (e.g., touch input made using a finger of the left hand) included in the multi-touch input may be changed once, and when there are multiple twenty-second points 1012 on the touch path from the sixteenth point (or the twentieth point) to the eighteenth point 1014, the moving direction of the second touch input included in the multi-touch input may be changed at least twice.

The processor of the electronic device 700 may display, on the display area, objects 1031, 1032, 1033, and 1034 for guiding a multi-touch input for changing the state of the flexible display 730. Before detecting a multi-touch input, the processor may display, on the display area, the objects 1031, 1032, 1033, and 1034 for guiding the user who wants to change the state of the flexible display 730 to make a touch input at a designated position. In the first state, the processor may display the ninth object 1031 at the fifteenth point adjacent to the third side surface 713 of the housing 710 in a direction opposite to the direction 1301 in which the slide plate 720 is drawn out, and may display the tenth object 1032 at the sixteenth point. In the first state, the processor may display the eleventh object 1033 at the nineteenth point, which is located adjacent to the first side surface 711 of the housing 710 in a direction substantially perpendicular to the direction 1301 in which the slide plate 720 is drawn out while being located adjacent to the third side surface 713, and may display the twelfth object 1034 at the twentieth point adjacent to the second side surface 712 of the housing 710. The processor may display the ninth object 1031 at the fifteenth point, may display the tenth object 1032 at the sixteenth point, may display the eleventh object 1033 at the nineteenth point, and may display the twelfth object 1034 at the twentieth point.

The processor may display an object at one or more points on a touch path on which the multi-touch input is to be made.

In the first state of the flexible display 730, when each of the touch points of the multi-touch input starts from a corresponding one of the fifteenth point and the sixteenth point (or the nineteenth point and the twentieth point), the processor may display objects at the next points (e.g., the twenty-first point 1011 and the twenty-second point 1012) of the display area in which the multi-touch input is to be moved.

When there are multiple twenty-first points 1011 and multiple twenty-second points 1012 on a touch path on which the multi-touch input is to be made, the processor may sequentially display multiple objects along the positions of the touch points. When each of the touch points is located at a corresponding one of the fifteenth point and the sixteenth point (or the nineteenth point and the twentieth point), the processor may display objects at a first twenty-first point and a first twenty-second point corresponding to the next points on the touch path, and when each of the touch points is located at a corresponding one of the first twenty-first point and the first twenty-second point, the processor may display other objects at a second twenty-first point and a second twenty-second point corresponding to the next points on the touch path.

When each of the touch points is located at a corresponding one of the twenty-first point 1011 and the twenty-second point 1012 corresponding to inflection points on the touch path, the processor may display other objects at the seventeenth point 1013 and the eighteenth point 1014 corresponding to end points on the touch path of the multi-touch input. When each of the touch points is located at a corresponding one of an n-th twenty-first point 1011 and an nth twenty-second point 1012, which are last inflection points at which the moving direction of the multi-touch input is changed on the touch path, the processor may display objects at the seventeenth point 1013 and the eighteenth point 1014 corresponding to end points on the touch path of the multi-touch input. Here, n is a natural number, which may represent that there is at least one twenty-first point 1011 and at least one twenty-second point 1012.

When each of the touch points is located at a corresponding one of the fifteenth point and the sixteenth point (e.g., the nineteenth point and the twentieth point) corresponding to the start points, the processor may not display objects at the twenty-first point 1011 and the twenty-second point 1012 corresponding to inflection points on the touch path and may display objects at the seventeenth point 1013 and the eighteenth points 1014 corresponding to the end points on the touch path.

Referring to FIG. 18, in the second state of the flexible display 730 (or the state in which the display area is expanded), when each of the touch points of the detected multi-touch input starts from a corresponding one of a twenty-third point (a point corresponding to the display position of the thirteenth object 1071) on the display area and a twenty-fourth point on the display area (a point corresponding to the display position of the fourteenth object 1072), and ends at a corresponding one of a twenty-fifth point 1053 on the display area and a twenty-sixth point 1054 on the display area, which are spaced apart from the touch points by a distance greater than or equal to the specified distance, the processor may drive the actuator so as to change the state of the flexible display 730 from the second state to the first state. Here, the twenty-third point and the twenty-fourth point may be located adjacent to the fourth side surface 714 of the housing 710 (corresponding to the first side surface 721 of the slide plate 720 in the state in which the display area is expanded) in a direction opposite to the direction 1302 in which the slide plate 720 is retracted (or the direction in which the display area is contracted), and the twenty-fifth point 1053 and the twenty-sixth point 1054 may be located adjacent to the third side surface 713 of the housing 710 in the direction 1302 in which the slide plate 720 is retracted. Even when each of the touch points of the multi-touch input starts from a corresponding one of a twenty-seventh point on the display area (a point corresponding to the display position of the fifteenth object 1073) and a twenty-eighth point on the display area (a point corresponding to the display position of the sixteenth object 1074), the processor may drive the actuator so as to change the state of the flexible display 730 from the second state to the first state when each of the touch points of the multi-touch input is moved by a distance greater than or equal to the specified distance. Here, each of the twenty-seventh point and the second-eighth point may be located adjacent to a corresponding one of the first side surface 711 of the housing 710 (or the third side surface 723 of the slide plate 720) and the second side surface 712 (or the second side surface 722 of the slide plate 720) in a direction substantially perpendicular to the direction 1302 in which the slide plate 720 is retracted while being located adjacent to the fourth side surface 714 (or the first side surface 721 of the slide plate 720).

Regardless of the moving distance of the multi-touch input, that is, the distance by which each of the touch points is moved, when each of the touch points starts from a position adjacent to the fourth side surface 714 or the first side surface 711 (and the second side surface 712) and ends at a position adjacent to the third side surface 713 (e.g., a second adjacent area 1055), the processor may perform control so as to change the state of the flexible display 730 from the second state to the first state.

The processor may drive the actuator so as to change the state of the flexible display 730 based on identifying that the moving direction of the multi-touch input for driving the actuator is changed at least once. In the second state, when the moving direction of the multi-touch input is changed and each of the touch points of the multi-touch input passes through a corresponding one of a twenty-ninth point 1051 and a thirtieth point 1052 of the display area on the path in which the touch points of the multi-touch input are moved, the processor may drive the actuator so as to change the state of the flexible display 730 from the second state to the first state.

There may be at least one twenty-ninth point 1051 and at least one thirtieth point 1052, which are inflection points at each of which the moving direction of the multi-touch input is changed. When there is only one twenty-ninth point 1051 on the touch path from the twenty-third point (a point corresponding to the display position of the thirteenth object 1071) or the twenty-seventh point (a point corresponding to the display position of the fifteenth object 1073)) to the twenty-fifth point 1053, the moving direction of first touch input (e.g., touch input made using a finger of the right hand) included in the multi-touch input may be changed once, and when there are multiple twenty-ninth points 1051 on the touch path from the twenty-third point (or the twenty-seventh point) to the twenty-fifth point 1053, the moving direction of the first touch input included in the multi-touch input may be changed at least twice. Similarly, when there is only one thirtieth point 1052 on the touch path from the twenty-fourth point (a point corresponding to the display position of the fourteenth object 1072)(or the twenty-eighth point (a point corresponding to the display position of the sixteenth object 1074)) to the twenty-sixth point 1054, the moving direction of the second touch input (e.g., touch input made using a finger of the left hand) included in the multi-touch input may be changed once, and when there are multiple thirtieth points 1052 on the touch path from the twenty fourth point (or the twenty eighth point) to the twenty-sixth point 1054, the moving direction of the second touch input included in the multi-touch input may be changed at least twice.

The processor of the electronic device 700 may display, on the display area, objects 1071, 1072, 1073, and 1074 for guiding a multi-touch input for changing the state of the flexible display 730. Before detecting a multi-touch input, the processor may display, on the display area, the objects 1071, 1072, 1073, and 1074 for guiding the user who wants to change the state of the flexible display 730 to make a touch input at a designated position. In the second state, the processor may display each of the thirteenth object 1071 and the fourteenth object 1072 at a corresponding one of the twenty-third point and the twenty-fourth point adjacent to the fourth side surface 714 of the housing 720 (corresponding to the first side surface 721 of the slide plate 720 in the state in which the display area is expanded) in a direction opposite to the direction 1302 in which the slide plate 720 is retracted. In the second state, the processor may display the fifteenth object 1073 at the twenty-seventh point, which is located adjacent to the first side surface 711 of the housing 710 (or the third side surface 723 of the slide plate 720) in a direction substantially perpendicular to the direction 1302 in which the slide plate 720 is retracted while being located adjacent to the fourth side surface 714 (or the first side surface 721 of the slide plate 720), and may display the sixteenth object 1074 at the twenty-eighth point adjacent to the second side surface 712 of the housing 710 (or the second side surface 722 of the slide plate 720). The processor may display the thirteenth object 1071 at the twenty-third point, may display the fourteenth object 1072 at the twenty-fourth point, may display the fifteenth object 1073 at the twenty-seventh point, and may display the sixteenth object 1074 at the twenty-eighth point.

The processor may display an object at one or more points on a touch path on which a multi-touch input is to be made. In the second state of the flexible display 730, when each of the touch points of the multi-touch input starts from a corresponding one of the twenty-third point and the twenty-fourth point (or the twenty-seventh point and the twenty-eighth point), the processor may display objects at the next points (e.g., the twenty-ninth point 1051 and the thirtieth point 1052) of the display area in which the multi-touch input is to be moved.

When there are multiple twenty-ninth points 1051 and multiple thirtieth points 1052 on a touch path on which the multi-touch input is to be made, the processor may sequentially display multiple objects along the positions of the touch points. When each of the touch points is located at a corresponding one of the twenty-third point and the twenty-fourth point (or the twenty-seventh point and the twenty-eighth point), the processor may display objects at a first twenty-ninth point and a first thirtieth point corresponding to the next points on the touch path, and when each of the touch points is located at a corresponding one of the first twenty-ninth point and the first thirtieth point, the processor may display other objects at a second twenty-ninth point and a second thirtieth point corresponding to the next points on the touch path.

When each of the touch points is located at a corresponding one of the twenty-ninth point 1051 and the thirtieth point 1052 corresponding to inflection points on the touch path, the processor may display other objects at the twenty-fifth point 1053 and the twenty-sixth point 1054 corresponding to end points on the touch path of the multi-touch input. When each of the touch points is located at a corresponding one of an n-th twenty-ninth point 1051 and an nth thirtieth point 1052, which are last inflection points at which the moving direction of the multi-touch input is changed on the touch path, the processor may display objects at the twenty-fifth point 1053 and the twenty-sixth 1054 corresponding to end points on the touch path of the multi-touch input. Here, n is a natural number, which may represent that there is at least one twenty-ninth point 1051 and at least one thirtieth point 1052.

When each of the touch points is located at a corresponding one of the twenty-third point and the twenty-fourth point (e.g., the twenty-seventh point and the twenty eighth point) corresponding to the start points, the processor may not display objects at the twenty-ninth point 1051 and the thirtieth point 1052 corresponding to inflection points on the touch path and may display objects at the twenty-fifth point 1053 and the twenty-sixth point 1054 corresponding to the end points on the touch path.

In the above description, the state in which the start points and the end points of the touch points of the multi-touch input are located in the display area adjacent to a side surface of the housing 710 has been described, but this disclosure is not limited thereto. The multi-touch input may be detected in aside bezel area of the housing 710. At least one of the start points and the end points of the touch points of the multi-touch input may be included in a bezel area formed on a side surface of the housing 710 (or a side surface of the slide plate 720).

According to various embodiments, an electronic device may include a flexible display including a first state in which a display area has a first size and a second state in which the display area is expanded in a first direction to have a second size larger than the first size, an actuator driven to change a state of the flexible display, and a processor operatively connected to the flexible display and the actuator. The processor may be configured to detect a touch input on the display area of the flexible display, identify whether a touch point of the touch input is moved from the point of the display area by a specified distance or more in a state in which the touch is maintained, and drive the actuator so as to change the state of the flexible display based on identifying that the touch point is moved from the point of the display area by the specified distance or more.

The processor may be configured to display, through the flexible display, a first object for guiding the touch input on at least one first point of the display area, which is located adjacent to at least one first side surface among side surfaces of the electronic device, before detecting the touch input.

The processor may be configured to display, through the flexible display, a second object at a second point of the display area adjacent to a second side surface different from the at least one first side surface among the side surfaces when the touch point is located at the at least one first point.

The at least one first point may include multiple points, and the processor may be configured to set a position of the second point based on a point at which the touch point is located among the multiple points.

The processor may be configured to drive the actuator so as to change the state of the flexible display based on identifying that a moving direction of the touch input is changed and the touch point passes through at least one third point of the display area on a path in which the touch point is moved from the first point of the display area to the second point of the display area.

The processor may be configured to display, through the flexible display, a first object on the at least one third point when the touch point is located at the first point, and display, through the flexible display, a second object on the second point when the touch point is located at the at least one third point.

The processor may be configured to drive the actuator so as to change the state of the flexible display from the first state to the second state based on identifying that the touch input is detected in the first state and that the touch point is moved from a first point of the display area, which is located adjacent to a first side surface in a second direction opposite to the first direction among side surfaces of the electronic device, or which is located adjacent to a second side surface in a third direction substantially perpendicular to the second direction while being located adjacent to the first side surface, to a second point of the display area, which is located adjacent to a third side surface in the first direction among the side surfaces.

The processor may be configured to drive the actuator so as to change the state of the flexible display from the second state to the first state based on identifying that the touch input is detected in the second state and that the touch point is moved from a first point of the display area, which is located adjacent to a first side surface in the first direction among side surfaces of the electronic device, or which is located adjacent to a second side surface in a second direction substantially perpendicular to the first direction while being located adjacent to the first side surface, to a second point of the display area, which is located adjacent to a third side surface in a third direction opposite to the first direction among the side surfaces.

The processor may be configured to detect another touch input on the display area of the flexible display within a specified time from a time point at which the touch input is terminated after the touch point of the touch input is moved by a first distance less than the specified distance, identify a second distance by which a touch point of the another touch input is moved on the display area in a state in which the another touch input is maintained, and drive the actuator so as to change the state of the flexible display based on identifying that a sum of the first distance and the second distance is greater than or equal to the specified distance.

The touch input may include a single touch input or a multi-touch input.

Figure 19:
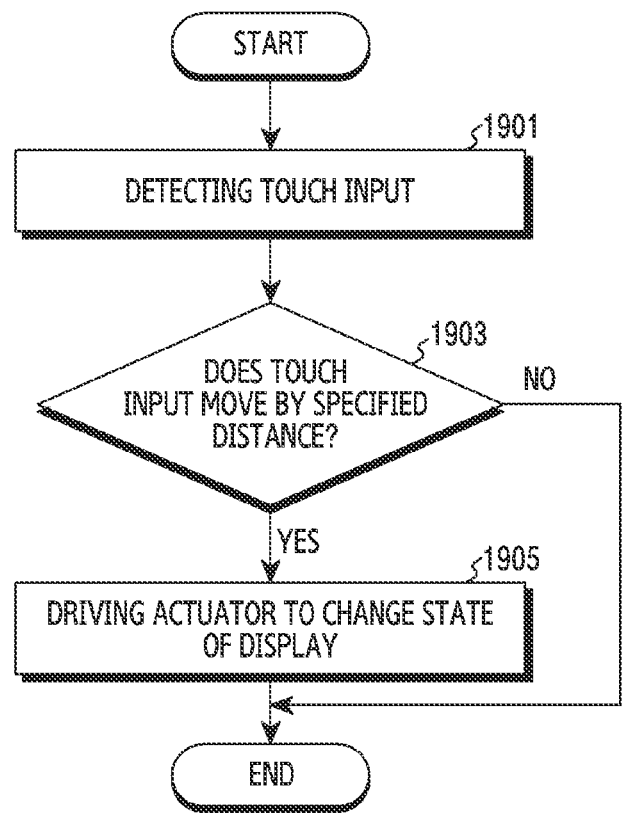
FIG. 19 is a flowchart of a display control method related to a state change of a flexible display, according to an embodiment.

FIG. 19 is a flowchart of a display control method related to a state change of a flexible display, according to an embodiment.

Referring to FIG. 19, at step 1901, the processor of an electronic device may detect touch input on the display area of a flexible display. The flexible display may have a first state in which the display area has a first size and a second state in which the display area is expanded to have a second size larger than the first size.

At step 1903, in the state in which the touch input is maintained, the processor may identify whether the touch point of the touch input is moved by a distance greater than or equal to a specified distance on the display area. The processor may identify whether the touch point of the detected touch input starts from a first point of the display area and ends at a second point of the display area spaced apart from the first point by a distance greater than or equal to the specified distance.

Based on identifying that the touch point is moved by a distance greater than or equal to the specified distance, at step 1905, the processor may drive the actuator so as to change the state of the flexible display 730. In the first state of the flexible display 730, when the touch point of the detected touch input is moved by a distance greater than or equal to the specified distance (when the distance between the first point and the second point is greater than or equal to the specified distance), the processor may drive the actuator so as to change the state of the flexible display 730 from the first state to the second state. In the second state of the flexible display 730, when the touch point of the detected touch input is moved by a distance greater than or equal to the specified distance (when the distance between the first point and the second point is greater than or equal to the specified distance), the processor may drive the actuator so as to change the state of the flexible display 730 from the second state to the first state.

Regardless of the moving distance of the touch input, that is, the distance by which the touch point has been moved, when the touch point starts from a first point of the display area adjacent to a side surface of the housing 710 and ends at a second point of the display area adjacent to another side surface of the housing 710, the processor may drive the actuator so as to change the state of the flexible display 730. In the first state of the flexible display 730, when the touch point of the detected touch input starts from a point, which is located adjacent to the third side surface 713 of the housing 710 in a direction opposite to the direction 1101 in which the display area is expanded (or the direction in which the slide plate 720 is drawn out), or from a point, which is located adjacent to the second side surface 712 of the housing 710 in a direction substantially perpendicular to the direction 1101 in which the display area is expanded while being located adjacent to the third side surface 713, and ends at a point, which is located adjacent to the fourth side surface 714 of the housing 710 in the direction 1101 in which the display area is expanded, the processor may drive the actuator so as to change the state of the flexible display 730 from the first state to the second state. As another example, in the second state of the flexible display 730, when the touch point of the detected touch input starts from a point, which is located adjacent to the fourth side surface 714 of the housing 710 (corresponding to the first side surface 721 of the slide plate 720 in the state in which the display area is expanded) in a direction opposite to the direction 1201 in which the display area is contracted (or the direction in which the slide plate 720 is retracted), or from a point, which is located adjacent to the second side surface 712 of the housing 710 (or the second side surface 722 of the slide plate 720) in a direction substantially perpendicular to the direction 1201 in which the display area is contracted while being located adjacent to the fourth side surface 714 (or the first side surface 721 of the slide plate 720), and ends at a point, which is located adjacent to the third side surface 713 of the housing 710 in the direction 1201 in which the display area is contracted, the processor may drive the actuator so as to change the state of the flexible display 730 from the second state to the first state.

The processor may drive the actuator so as to change the state of the flexible display 730 based on identifying that the moving direction of a touch input for driving the actuator is changed at least once. In the first state of the flexible display 730, when the moving direction of the touch input is changed and the touch point passes through at least one point of the display area on the path in which the touch point of the touch input is moved, the processor may drive the actuator so as to change the state of the flexible display 730 from the first state to the second state. In the second state of the flexible display 730, when the moving direction of the touch input is changed and the touch point passes through at least one point of the display area on the path in which the touch point of the touch input is moved, the processor may drive the actuator so as to change the state of the flexible display 730 from the second state to the first state.

The processor may display, on the display area, an object for guiding a touch input for changing the state of the flexible display 730. Before detecting the touch input, the processor may display, on the display area, an object for guiding the user who wants to change the state of the flexible display 730 to make a touch input at a designated position. In the first state of the flexible display 730, the processor may display an object at at least one point, which is located adjacent to the third side surface 713 of the housing 710 in a direction opposite to the direction 1101 in which the slide plate 720 is drawn out, or at a point, which is located adjacent to the second side surface 712 of the housing 710 in a direction substantially perpendicular to the direction 1101 in which the slide plate 720 is drawn out while being located adjacent to the third side surface. In the second state of the flexible display, the processor may display an object at at least one point, which is located adjacent to the fourth side surface 714 of the housing 710 (corresponding to the first side surface 721 of the slide plate 720 in the state in which the display area is expanded) in a direction opposite to the direction 1201 in which the slide plate 720 is retracted, or at a point, which is located adjacent to the second side surface 712 of the housing 710 (or the second side surface 722 of the slide plate 720) in a direction substantially perpendicular to the direction 1201 in which the slide plate 720 is retracted while being located adjacent to the fourth side surface 714 (or the first side surface 721 of the slide plate 720).

The processor may display an object at one or more points on a touch path on which touch input is to be made. In the first state of the flexible display 730, when the touch point of the touch input starts from at least one point, which is located adjacent to the third side surface 713 of the housing 710 in a direction opposite to the direction 1101 in which the slide plate 720 is drawn out, or at a point, which is located adjacent to the second side surface 712 of the housing 710 in a direction substantially perpendicular to the direction 1101 in which the slide plate 720 is drawn out while being located adjacent to the third side surface 713, the processor may display objects at one or more of the next points of the display area in which the touch input is to be moved. In the second state of the flexible display 730, when the touch point of the touch input starts from at least one of a point, which is located adjacent to the fourth side surface 714 of the housing 710 (corresponding to the first side surface 721 of the slide plate 720 in the state in which the display area is expanded) in a direction opposite to the direction 1201 in which the slide plate 720 is retracted, and a point, which is located adjacent to the second side surface 712 of the housing 710 (or the second side surface 722 of the slide plate 720) in a direction substantially perpendicular to the direction 1201 in which the slide plate 720 is retracted while being located adjacent to the fourth side surface 714 (or the first side surface 721 of the slide plate 720), the processor may display objects at one or more of the next points of the display area in which the touch input is to be moved. Here, the one or more of the next points of the display area may include at least one of a point corresponding to an inflection point on the touch path at which the moving direction of the touch input is changed and a point corresponding to an end point on the touch path.

When the touch point of the touch input is located at a start point, the processor may not display an object at a point corresponding to an inflection point on the touch path, but may display an object at a point corresponding to an end point on the touch path.

According to various embodiments, a method of controlling a display of an electronic device may include detecting a touch input at a point on the display area of a flexible display including a first state in which a display area has a first size and a second state in which the display area is expanded in a first direction to have a second size larger than the first size, identifying whether a touch point of the touch input is moved from the point of the display area by a specified distance or more in a state in which the touch input is maintained, and driving the actuator so as to change the state of the flexible display based on identifying that the touch point is moved from the point of the display area by the specified distance or more.

The display control method may further include displaying, through the flexible display, a first object for guiding the touch input on at least one first point of the display area, which is located adjacent to at least one first side surface among side surfaces of the electronic device, before detecting the touch input.

The display control method may further include displaying, through the flexible display area, a second object at a second point of the display area adjacent to a second side surface different from the at least one first side surface among the side surfaces when the touch point is located at the at least one first point.

The at least one first point may include multiple points, and the displaying of the second object at the second point may include setting a position of the second point based on a point at which the touch point is located among the multiple points.

The display control method may further include driving the actuator so as to change the state of the flexible display based on identifying that a moving direction of the touch input is changed and the touch point passes through at least one third point of the display area on a path in which the touch point is moved from the first point of the display area to the second point of the display area.

The display control method may further include displaying, through the flexible display, a first object on the at least one third point when the touch point is located at the first point, and displaying, through the flexible display, a second object on the second point when the touch point is located at the at least one third point.

The display control method may further include driving the actuator so as to change the state of the flexible display from the first state to the second state based on identifying that the touch input is detected in the first state and that the touch point is moved from a first point of the display area, which is located adjacent to a first side surface in a second direction opposite to the first direction among side surfaces of the electronic device, or which is located adjacent to a second side surface in a third direction substantially perpendicular to the second direction while being located adjacent to the first side surface, to a second point of the display area, which is located adjacent to a third side surface in the first direction among the side surfaces.

The display control method may further include driving the actuator so as to change the state of the flexible display from the second state to the first state based on identifying that the touch input is detected in the second state and that the touch point is moved from a first point of the display area, which is located adjacent to a first side surface in the first direction, or which is located adjacent to a second side surface in a second direction substantially perpendicular to the first direction while being located adjacent to the first side surface, to a second point of the display area, which is located adjacent to a third side surface in a third direction opposite to the first direction among the side surfaces.

The display control method may further include detecting another touch input on the display area of the flexible display within a specified time from a time point at which the touch input is terminated after the touch point of the touch input is moved by a first distance less than the specified distance, identifying a second distance by which a touch point of the another touch input is moved on the display area in a state in which the another touch input is maintained, and driving the actuator so as to change the state of the flexible display based on identifying that the sum of the first distance and the second distance is greater than or equal to the specified distance.

The touch input may include a single touch input or a multi-touch input.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a flexible display including a first state in which a display area has a first size and a second state in which the display area is expanded in a first direction to have a second size that is larger than the first size;
   an actuator driven to change a state of the flexible display between the first state and the second state; and
   a processor operatively connected to the flexible display and the actuator,
   wherein the processor is configured to:
      detect a touch input on a first point of the display area, which is located adjacent to a side surface of the electronic device;
      identify whether the touch input is maintained and the touch input is moved from the first point of the display area by a specified distance or more in the first direction while the flexible display is in the first state;
      drive the actuator so as to change the state of the flexible display based on identifying that the touch input is maintained and the touch input is moved from the first point of the display area by the specified distance or more in the first direction while the flexible display is in the first state;
      display, through the flexible display a first object at the first point for guiding the movement of the touch input from the first point to a second point of the display area; and
      display, through the flexible display, a second object at the second point different from the first point when the touch input is located at the first point,
      wherein a position of the second point is set based on where the first point is located.

2. The electronic device of claim 1, wherein the processor is further configured to:
   drive the actuator so as to change the state of the flexible display based on identifying that a moving direction of the touch input is changed and the touch input passes through at least one third point of the display area on a path in which the touch input is moved from the first point of the display area to the second point of the display area.

3. The electronic device of claim 2, wherein the processor is further configured to:
   display, through the flexible display, a third object at the at least one third point when the touch input is located at the first point; and
   display, through the flexible display, a fourth object at the second point when the touch input is located at the at least one third point.

4. The electronic device of claim 1, wherein the processor is further configured to:
   drive the actuator so as to change the state of the flexible display from the first state to the second state based on identifying that the touch input is detected in the first state and that the touch input is moved from the first point of the display area, which is located adjacent to at least one first side surface among side surfaces of the electronic device, to the second point of the display area, which is located adjacent to a second side surface in the first direction among the side surfaces,
   wherein the at least one first side surface includes a third side surface in a second direction opposite the first direction among the side surfaces or a fourth side surface in a third direction substantially perpendicular to the second direction while being located adjacent to the third side surface among the side surfaces.

5. The electronic device of claim 1, wherein the processor is further configured to:

identify whether the touch input is maintained and the touch input is moved from a third point of the display area by the specified distance or more in a second direction opposite the first direction while the flexible display is in the second state;

drive the actuator so as to change the state of the flexible display from the second state to the first state based on identifying that the touch input is detected in the second state and that the touch input is moved from a third point of the display area, which is located adjacent to at least one first side surface among side surfaces of the electronic device, to a fourth point of the display area, which is located adjacent to a second side surface in the second direction among the side surfaces, wherein the at least one first side surface includes a third side surface in the first direction among the side surfaces or a fourth side surface in a third direction substantially perpendicular to the first direction while being located adjacent to the third side surface among the side surfaces.

6. The electronic device of claim 1, wherein the processor is further configured to:

detect another touch input on the display area of the flexible display within a specified time from a time point at which the touch input is terminated after the touch input is moved by a first distance less than the specified distance;

identify a second distance by which the another touch input is maintained and the another touch input is moved on the display area; and drive the actuator so as to change the state of the flexible display based on identifying that a sum of the first distance and the second distance is greater than or equal to the specified distance.

7. The electronic device of claim 1, wherein the touch input includes a single touch input or a multi-touch input.

8. A method of controlling a display of an electronic device, the method comprising:

detecting a touch input at a first point of a display area, which is located adjacent to a side surface of the electronic device, on a flexible display including a first state in which the display area has a first size and a second state in which the display area is expanded in a first direction to have a second size that is larger than the first size;

identifying whether the touch input is maintained and the touch input is moved from the first point of the display area by a specified distance or more in the first direction while the flexible display is in the first state;

driving an actuator so as to change the state of the flexible display based on identifying that the touch input is maintained and the touch input is moved from the first point of the display area by the specified distance or more in the first direction while the flexible display is in the first state;

displaying, through the flexible display, a first object at the first point for guiding the movement of the touch input from the first point to a second point of the display area; and displaying, through the flexible display, a second object at the second point different from the first point when the touch input is located at the first point, wherein a position of the second point is set based on where the first point is located.

9. The method of claim 8, further comprising:

driving the actuator so as to change the state of the flexible display based on identifying that a moving direction of the touch input is changed and the touch input passes through at least one third point of the display area on a path in which the touch input is moved from the first point of the display area to the second point of the display area.

10. The method of claim 9, further comprising:

displaying, through the flexible display, a third object at the at least one third point when the touch input is located at the first point; and displaying, through the flexible display, a fourth object at the second point when the touch input is located at the at least one third point.

11. The method of claim 8, further comprising:

driving the actuator so as to change the state of the flexible display from the first state to the second state based on identifying that the touch input is detected in the first state and that the touch input moved from the first point of the display area, which is located adjacent to at least one first side surface among side surfaces of the electronic device, to the second point of the display area, which is located adjacent to a second side surface in the first direction among the side surfaces, wherein the at least one first side surface includes a third side surface in a second direction opposite the first direction among the side surfaces or a fourth side surface in a third direction substantially perpendicular to the second direction while being located adjacent to the third side surface among the side surfaces.

12. The method of claim 8, further comprising:

identifying whether the touch input is maintained and the touch input is moved from a third point of the display area by the specified distance or more in a second direction opposite the first direction while the flexible display is in the second state;

driving the actuator so as to change the state of the flexible display from the second state to the first state based on identifying that the touch input is detected in the second state and that the touch input is moved from a third point of the display area, which is located adjacent to at least one first side surface among side surfaces of the electronic device, to a fourth point of the display area, which is located adjacent to a second side surface in the second direction among the side surfaces, wherein the at least one first side surface includes a third side surface in the first direction among the side surfaces or a fourth side surface in a third direction substantially perpendicular to the first direction while being located adjacent to the third side surface among the side surfaces.

13. The method of claim 8, further comprising:

detecting another touch input on the display area of the flexible display within a specified time from a time point at which the touch input is terminated after the touch input is moved by a first distance less than the specified distance;

identifying a second distance by which the another touch input is maintained and the another touch input is moved on the display area; and driving the actuator so as to change the state of the flexible display based on identifying that a sum of the first distance and the second distance is greater than or equal to the specified distance.

14. The method of claim 8, wherein the touch input includes a single touch input or a multi-touch input.

* * * * *